(12) United States Patent
Cheng et al.

(10) Patent No.: US 10,972,972 B2
(45) Date of Patent: Apr. 6, 2021

(54) METHODS AND APPARATUSES FOR OPERATING MULTIPLE ANTENNA PANELS

(71) Applicant: FG Innovation Company Limited, Tuen Mun (HK)

(72) Inventors: Yu-Hsin Cheng, Hsinchu (TW); Hung-Chen Chen, Hsinchu (TW); Chie-Ming Chou, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/511,170

(22) Filed: Jul. 15, 2019

(65) Prior Publication Data

US 2020/0029274 A1 Jan. 23, 2020

Related U.S. Application Data

(60) Provisional application No. 62/699,465, filed on Jul. 17, 2018.

(51) Int. Cl.

| | |
|---|---|
| *H04W 48/20* | (2009.01) |
| *H04W 76/28* | (2018.01) |
| *H04W 52/02* | (2009.01) |
| *H04B 17/309* | (2015.01) |
| *H04W 24/10* | (2009.01) |
| *H04W 72/04* | (2009.01) |

(52) U.S. Cl.
CPC .......... *H04W 48/20* (2013.01); *H04B 17/309* (2015.01); *H04W 24/10* (2013.01); *H04W 52/0216* (2013.01); *H04W 72/042* (2013.01); *H04W 76/28* (2018.02)

(58) Field of Classification Search
CPC ..... H04W 48/20; H04W 76/28; H04W 24/10; H04W 52/0216; H04W 72/042; H04B 17/309
See application file for complete search history.

(56) References Cited

U.S. PATENT DOCUMENTS

2013/0040581 A1* 2/2013 Alberth ............... H04B 7/0602
455/70
2018/0145742 A1* 5/2018 Li ........................ H04B 7/0874

FOREIGN PATENT DOCUMENTS

WO 2018031082 A1 2/2018

OTHER PUBLICATIONS

3GPP TSG RAN; NR; Physical layer procedures for data; TS 38.214, V15.2.0 (Jun. 2018) (Year: 2018).*

(Continued)

*Primary Examiner* — Chi H Pham
*Assistant Examiner* — Ji-Hae Yea
(74) *Attorney, Agent, or Firm* — ScienBiziP, P.C.

(57) ABSTRACT

Methods and apparatuses for operating multiple antenna panels are provided. The wireless communication device includes a plurality of antenna panels and a processor coupled to the antenna panels. The processor is configured to maintain a plurality of leading time values. The plurality of leading time values may indicate a plurality of leading time durations. The processor is further configured to receive an indicator for antenna panel status information from a base station, and apply one of the plurality of leading time values to switch an antenna panel status of the plurality of antenna panels based on the indicator for antenna panel status information.

28 Claims, 27 Drawing Sheets

(56) References Cited

OTHER PUBLICATIONS

3GPP TSF RAN; NR; Medium Access Control (MAC) protocol specification; TS 38.321 V15.2.0 (Jun. 2018) (Year: 2018).*
MediaTek Inc. ("Discussion on NR UE Feature List", 3GPP TSG RAN WG1 Meeting #93, R1-1806792, May 21-25, 2018) (Year: 2018).*
Samsung Discussion on group-based beam reporting 3GPP TSG RAN WG1 Meeting #90 R1-1714511 Jun. 25, 2017 (Jun. 25, 2017) the whole document.

* cited by examiner

502

```
- UE capability
    - power saving indicator
        - {True/Support, False/Not support}
    - timer for antenna panel status
        - {True/Support, False/Not support}
    - maximum number of support antenna panels
        - {one, two, four or eight}
    - support indication method
        - {True/Support, False/Not support}
    - require time for antenna panel status switch
        - {1ms, 2ms, 3ms, 4ms}
    - UE assistance
        - {True/Support, False/Not support}
```

- Timer for antenna panel states
  - length
    - 4 slots

- tci-State #1
  - qcl-Type1
    - referenceSignal
      - CSI RS resource#4
    - qcl-TypeA
  - qcl-Type2
    - referenceSignal
      - CSI RS resource#5
    - qcl-TypeA
  - power saving mode
    - true

⋮

- tci-State #64
  - qcl-Type1
    - referenceSignal
      - CSI RS resource#4
    - qcl-TypeA
  - qcl-Type2
    - referenceSignal
      - CSI RS resource#5
    - qcl-TypeA
  - power saving mode
    - false

- antenna panel status
    - power saving mode
        - true

FIG. 9

1302 → — NZP-CSI-RS-ResourceSet
— aperiodicTriggeringOffset
— index:10

1304 →

| Row index | K0(normal,long) |
|---|---|
| 00 | (0 slot, 4 slots) |
| 01 | (1 slot, 4 slots) |
| 10 | (2 slot, 6 slots) |
| 11 | (3 slot, 7 slots) |

| R | R | Cell ID | C |
|---|---|---------|---|
| R | R | 00000   | 0 | OCT 1

```
- DRX configuration
    - Inactivity timer
        - 2ms
    - DRX cycle
        - 50 ms
        ⋮
- Antenna panel status
    - Power saving mode
        -false
    - Timer for antenna panel states
        - length
            - 4 slots
        ⋮
```

- DRX configuration
  - Inactivity timer
    - 2ms
  - DRX cycle
    - 50 ms
    ⋮
- Antenna panel status
  - Power saving mode
    - true
    ⋮

FIG. 21

METHODS AND APPARATUSES FOR OPERATING MULTIPLE ANTENNA PANELS

CROSS-REFERENCE TO RELATED APPLICATION(S)

The present application claims the benefit of and priority to a provisional U.S. Patent Application Ser. No. 62/699,465 filed on Jul. 17, 2018, entitled "Method and Apparatus for leading time of beam switching for multi-panel transmission,".

FIELD

The present disclosure generally relates to wireless communications, and more particularly, to methods and apparatuses for operating multiple antenna panels.

BACKGROUND

Various efforts have been made to improve different aspects of wireless communications (e.g., data rate, latency, reliability, mobility, etc.) for the next generation (e.g., 5G New Radio (NR)) wireless communication systems. Multi Input Multi Output (MIMO) is one of the key features in the next generation wireless communication systems. With the MIMO technology, a number of antenna panels at the transceiver/receiver can bring extra degrees of freedom to increase the data throughput, beamforming gain and coverage.

However, due to the lack of proper signaling mechanisms, the network may not know the current antenna panel status (e.g., how many and/or which of the antenna panels of the user device is turned on/off) at the UE side, resulting in a reduced scheduling performance.

Hence, there is a need in the art for an improved signaling mechanism for operating multiple antenna panels.

SUMMARY

The present disclosure is directed to methods and apparatuses for operating multiple antenna panels.

According to an aspect of the present disclosure, a wireless communication device is provided. The wireless communication device includes a plurality of antenna panels and a processor coupled to the antenna panels. The processor is configured to maintain a plurality of leading time values. The plurality of leading time values may indicate a plurality of leading time durations. The processor is further configured to receive an indicator for antenna panel status information from a base station (BS), and apply one of the plurality of leading time values to switch an antenna panel status of the plurality of antenna panels based on the indicator for antenna panel status information.

According to another aspect of the present disclosure, a method for operating a plurality of antenna panels is provided. The method includes maintaining, by a wireless communication device, a plurality of leading time values. The plurality of leading time values indicates a plurality of leading time durations. The method further includes receiving, by the wireless communication device, an indicator for antenna panel status information from a BS, and applying, by the wireless communication device, one of the plurality of leading time values to switch an antenna panel status of the plurality of antenna panels based on the indicator for antenna panel status information.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

FIG. 5 is an example data structure indicating user equipment (UE) capability information, in accordance with example implementations of the present disclosure.

FIG. 6 is an example data structure indicating a configuration of a timer for antenna panel status, in accordance with example implementations of the present disclosure.

FIG. 8 is an example data structure indicating TCI state configuration, in accordance with example implementations of the present disclosure.

FIG. 9 is an example data structure of an indicator for antenna panel status, in accordance with example implementations of the present disclosure.

FIG. 13 is an example data structure indicating an aperiodic CSI RS reception configuration, in accordance with example implementations of the present disclosure.

FIG. 14 is an example of a Media Access Control (MAC)-Control Element (CE) message, in accordance with example implementations of the present disclosure.

FIG. 19 is an example data structure indicating a Radio Resource Control (RRC) configuration for a UE, in accordance with example implementations of the present disclosure.

FIG. 21 is an example data structure indicating an RRC configuration for a UE, in accordance with example implementations of the present disclosure.

DETAILED DESCRIPTION

Figure 1:
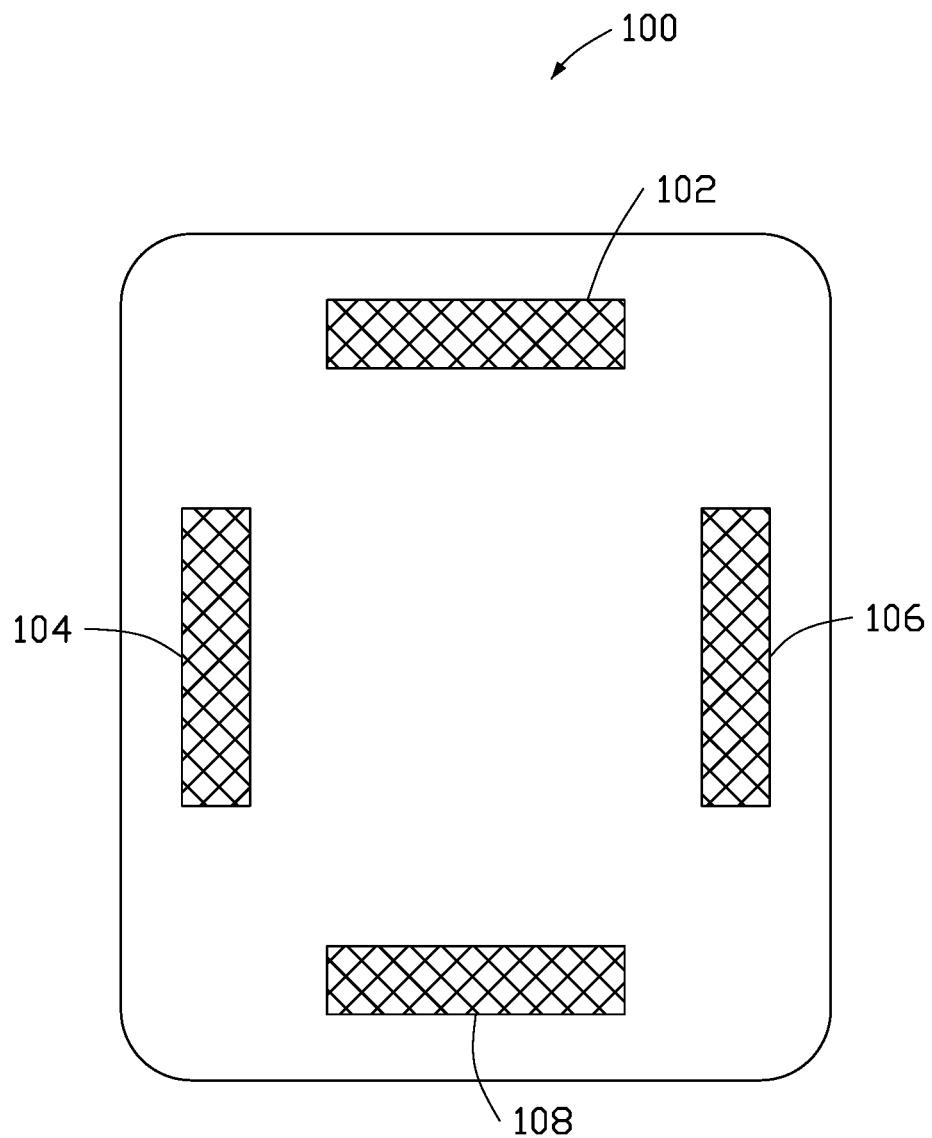
FIG. 1 is a schematic diagram illustrating a wireless communication device including a number of antenna panels, in accordance with example implementations of the present disclosure.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of applications specific integrated circuitry (ASIC), programmable logic arrays, and/or using one or more digital signal processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD-ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, an LTE-Advanced Pro system, or a 5G New Radio (NR) Radio Access Network) typically includes at least one BS, at least one UE, and one or more optional network elements that provide connection towards a network. The UE communicates with the network (e.g., a core network (CN), an evolved packet core (EPC) network, an Evolved Universal Terrestrial Radio Access network (E-UTRAN), a 5G Core (5GC), or an internet), through a radio access network (RAN) established by one or more BSs.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a personal digital assistant (PDA) with wireless communication capability. The UE is configured to receive and transmit signals over an air interface to one or more cells in a radio access network.

A BS may be configured to provide communication services according to at least one of the following Radio Access Technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic Wideband-Code Division Multiple Access (W-CDMA), High-Speed Packet Access (HSPA), LTE, LTE- A, eLTE (evolved LTE, e.g., LTE connected to 5GC), New Radio (NR, often referred to as 5G), and/or LTE-A Pro. However, the scope of the present application should not be limited to the above-mentioned protocols.

A BS may include, but is not limited to, a Node B (NB) as in the UMTS, an evolved Node B (eNB) as in the LTE or LTE-A, a Radio Network Controller (RNC) as in the UMTS, a Base Station Controller (BSC) as in the GSM/GERAN, a ng-eNB as in an E-UTRA BS in connection with the 5GC, a next generation Node B (gNB) as in the 5G-RAN, and any other apparatus capable of controlling radio communication and managing radio resources within a cell. The BS may connect to serve the one or more UEs through a radio interface to the network.

The BS is operable to provide radio coverage to a specific geographical area using a plurality of cells forming the radio access network. The BS supports the operations of the cells. Each cell is operable to provide services to at least one UE within its radio coverage. More specifically, each cell (often referred to as a serving cell) provides services to serve one or more UEs within its radio coverage (e.g., each cell schedules the downlink and optionally uplink resources to at least one UE within its radio coverage for downlink and optionally uplink packet transmissions). The BS can communicate with one or more UEs in the radio communication system through the plurality of cells. A cell may allocate Sidelink (SL) resources for supporting Proximity Service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as enhanced Mobile Broadband (eMBB), massive Machine Type Communication (mMTC), Ultra-Reliable and Low-Latency Communication (URLLC), while fulfilling high reliability, high data rate and low latency requirements. The orthogonal frequency-division multiplexing (OFDM) technology as agreed in the 3$^{rd}$ Generation Partnership Project (3GPP) may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) polar code. The coding scheme adaption may be configured based on the channel conditions and/or the service applications.

Moreover, it is also considered that in a transmission time interval TX of a single NR frame, a Downlink (DL) transmission data, a guard period, and an uplink (UL) transmission data should at least be included, where the respective portions of the DL transmission data, the guard period, the UL transmission data should also be configurable, for example, based on the network dynamics of NR. In addition, SL resource may also be provided in an NR frame to support ProSe services or V2X services.

In addition, the terms "system" and "network" herein may be used interchangeably. The term "and/or" herein is only an association relationship for describing associated objects and represents that three relationships may exist. For example, A and/or B may indicate that: A exists alone, A and B exist at the same time, and B exists alone. In addition, the character "/" herein generally represents that the former and latter associated objects are in an "or" relationship.

NR power saving is an issue which have been identified in the 3GPP meetings. The objective of this issue is to minimize the power consumption with an improved wake up/go-to-sleep mechanism, and to reduce the power consumption during the network access phase when a UE operates in the RRC_CONNECTED mode. In some power saving schemes the focus is on minimizing the dominate factors of power consumption during the network access phase. Such dominate factors may include, for example, the processing of an aggregated bandwidth, the active Radio Frequency (RF) chain number, the active reception/transmission time, and the dynamic transition to a power efficient mode. In the majority cases of LTE scenarios, since little to no data may be transmitted in a Transmission Time Interval (TTI), a power saving scheme which is capable of dynamically adapting different data arrivals in the RRC_CONNECTED mode may be needed. The dynamic adaptation to the data traffic may be implemented in different dimensions, such as carriers, antennas, beamforming mechanisms, and bandwidths.

Furthermore, approaches to enhance the transition between a normal power consumption mode and a power saving mode may be needed to be considered. For example, both the network-assisted and the UE-assisted approaches may be considered for the UE's power saving mechanism.

Issues related to the leading time for beam switching may affect the power consumption. The leading time for beam switching is, or may reflect, the minimum required time for a UE to set up its antenna panel(s) for providing an indicated RX/TX beam to receive or transmit data. For example, the leading time for beam switching may be the time period between the time the UE receives a command that leads to a change(s) in the Rx beam/antenna panel status and the time that the change(s) actually occurs. In some of the present implementations, if a TCI state has not yet activated by a MAC-CE, the indicated mapping (between the TCI states and the codepoints of a Downlink Control Information (DCI) field "Transmission Configuration Indicator") should be applied starting from a specific time point (e.g., slot n+3 ms+1), when a Hybrid Automatic Repeat Request Acknowledgement (HARQ-ACK) (which is corresponding to a Physical Downlink Shared Channel (PDSCH) which carries the activation command) is transmitted in the slot n. In some of such implementations, this specific time point may be used as the starting time point of a leading time for beam switching. In some of the present implementations, if the TCI state has been activated by a MAC-CE, the leading time for beam switching may have the same starting time point as the scheduling offset. The scheduling offset, in some implementations, may be a time duration starting from the end of the last symbol of a Physical Downlink Control Channel (PDCCH) to the beginning of the first symbol of a PDSCH.

In addition, the beam switching delay may affect a UE's power consumption in the Frequency Range 2 (FR2). In order for the UE to optimize the power consumption, the UE may need to be given a sufficient leading time for beam switching. For example, the leading time for beam switching may be two milliseconds (ms) from the time a beam switch command is received (e.g., for a control-channel-based way) or acknowledged (e.g., for a MAC-CE based way) to the time the beam switch is completed.

In some implementations of the present disclosure, there may be at least three ms between two consecutive commands indicating a beam switch. Such time value may be adjusted if a longer time value is needed. In addition, from the time the UE receives the beam switch command to the time the UE switches its beam/antenna panel status, the UE may still use the active Rx beam for data reception, and there may be no interruption in the communication with the BS (e.g., a gNB).

FIG. 1 is a schematic diagram illustrating a wireless communication device (e.g., a UE) including a number of antenna panels, in accordance with example implementations of the present disclosure. As shown in FIG. 1, a wireless communication device 100 includes four antenna panels 102, 104, 106 and 108. The antenna panels described herein may be referred to antenna arrays or antenna ports. The antenna arrays may include a number of physical antennas, while the antenna ports may not correspond to physical antennas, but rather may be logical entities distinguished by their channel models.

The ON/OFF state of each antenna panel 102, 104, 106 and 108 may be switched by the wireless communication device 100. Depending on the ON/OFF state of each antenna panel 102, 104, 106 and 108, the antenna panels 102, 104, 106 and 108 may have different antenna panel status. For example, the antenna panel status of the antenna panels 102, 104, 106 and 108 may be determined as a first antenna panel status if only the antenna panel 102 is turned on and the other antenna panels 104, 106 and 108 are turned off, and determined as a second antenna panel status if all of the antenna panels 102, 104, 106 and 108 are turned on. It should be noted that the wireless communication device 100 including four antenna panels 102, 104, 106 and 108 in FIG. 1 is for illustrative purposes only, and not intended to limit the scope of the present invention. That is, a wireless communication device (e.g., the wireless communication device 100) may include a different number of antenna panels than 4 (e.g., 6 panels, 8 panels, etc.) in some of the present implementations. Furthermore, the antenna panel status of the antenna panels of the wireless communication device may be defined arbitrarily based on the ON/OFF states and/or the number of the antenna panels.

In many cases, a BS (e.g., a gNB) may not know the current antenna panel status of the UE, which causes some issues since the BS always have to consider the worst case for the UE to perform the beam switching. For example, the BS may need to configure the UE with a leading time for beam switching which is much longer than a leading time the UE actually needs. As the leading time becomes longer, the efficiency and flexibility of the UE's operations may get lower. Hence, a signaling mechanism that helps the BS to obtain the antenna panel status of the UE may enhance the power consumption.

Another issue is related to the scheduling offset values. From Radio layer 1's (RAN1's) perspective, if a UE is configured with a "tci-PresentInDCI" Information Element (IE) set to "enabled" (for a Coreset Resource Set (CORESET) that schedules a PDSCH), the UE may assume that the TCI field is present in the DCI format 1_1 (which is transmitted over the PDCCH of the CORESET). On the other hand, if the tci-PresentInDCI IE is not configured for the CORESET (or the tci-PresentInDCI IE is set to "disabled"), or the PDSCH is scheduled by a DCI format 1_0 (e.g., for determining the PDSCH antenna port's QCL), the UE may assume that the TCI state applied for receiving the PDSCH is identical to the TCI state applied for receiving the PDCCH of the CORESET. In addition, if the tci-PresentInDCI IE is set to "enabled" and the PDSCH is scheduled by the DCI format 1_1, the UE may apply a TCI state which is indicated by the DCI to determine the QCL of the antenna port for the PDSCH. This is because the TCI state may indicate the QCL type and the QCL Reference Signal (RS) corresponding to the RX beam for receiving the PDSCH. If the time offset between the reception of the DL DCI and the corresponding PDSCH is equal to or greater than a scheduling offset value (e.g., a threshold called "Threshold-Sched-Offset"), the UE may assume that the antenna ports of one Demodulation Reference Signal (DM-RS) port group of a PDSCH of a serving cell may be QCLed with the RS(s) that is associated with the QCL type parameter(s) given by the indicated TCI state. For DL transmissions, the scheduling offset may be referred as a time period starting from the end of a PDCCH to the beginning of a PDSCH. For example, the scheduling offset may be a time period that starts from the first symbol after the end of the PDCCH to the first symbol of the PDSCH scheduled by the PDCCH. In some implementations of the present disclosure, the scheduling offset value may be determined based on the UE's capability.

However, for a scheduling offset value configured for a UE that includes only one antenna panel (or a single-antenna-panel UE), such value may not fulfill the leading time for beam switching required by another UE that includes multiple antenna panels (or a multiple-antenna-panel UE). Thus, a mechanism that is able to deal with how the UE determines which scheduling offset value (e.g., Threshold-Sched-Offset) to be applied may be needed.

Another issue is related to Sounding Reference Signal (SRS) transmission. Specifically, for aperiodic SRS transmissions and aperiodic CSI-RS receptions, the UE may need to follow the aperiodic slot triggering offset configured in the SRS resource set configuration and the CSI-RS resource set configuration, respectively. Considering that a longer leading time may be applied to the power saving operation in the multiple-antenna-panel cases, the required triggering offset configured for the single-antenna-panel cases and the multiple-antenna-panel cases may be different. Although a BS can solve this issue by configuring multiple triggering offset values for one resource set, it might cause overhead that occupies some bitfields of a DCI trigger state for an SRS request and/or a CSI request. Hence, a mechanism for determining the triggering offset of the aperiodic SRS/CSI-RS transmissions may be needed.

In addition, for SRS transmissions, a UE may be configured to switch its antenna panel status for a sounding procedure for a DL CSI acquisition. If the UE is configured with a higher layer parameter such as "SRS-SetUseusage (or SRS-usage)" in an SRS resource set (e.g., SRS-ResourceSet), and the SRS-SetUseusage (or SRS-usage) is set as "antennaSwitching," the UE may be configured with one of the following configurations depending on the UE's capability: 1TX2RX, 2TX4RX, 1TX4RX, 1TX4RX/2TX4RX, and TX=RX. The BS may configure the UEs having different capabilities with different number of SRS resource sets which contain different SRS resources. For example, for a UE configured with the 1TX2RX configuration, the BS may configure one SRS resource set which may contain two SRS resources. Since the UE needs to select and switch to the TX for transmission, there may be a guard period between each SRS transmission. The guard period may be one or two symbols, depending on the numerology of the SRS resource. However, if the UE has multiple antenna panels and at least parts of the antenna panels are turned off for power saving, the guard period for one or two symbols may not fulfill the leading time of at least 2 ms for turning on the antenna panel(s). Hence, a mechanism for the UE to perform antenna switching may be needed.

In accordance with some implementations of the present disclosure, methods and apparatuses provide techniques for addressing the above-noted issues.

For example, techniques are described for determining the scheduling offset value(s). As described above, the leading time for beam switching may be the minimum required time for a UE to set up the antenna panels for providing an indicated RX/TX beam to receive/transmit the data. If the scheduling offset of a DL/UL RSs/channel reception/transmission cannot fulfill the leading time requirement, the UE may not be able to transmit/receive the RSs/channel successfully. In some implementations of the present disclosure, the leading time may be related to the antenna panel status. In addition, different values of the leading time may be predefined in the 3GPP technical specification(s) for each or all of the antenna panel statuses. For example, each antenna panel status may have its own leading time value. In another example, all antenna panel statuses may have the same leading time value. In some implementations of the present disclosure, the UE may report the required leading time for each or all of the antenna panel statuses. In some implementations of the present disclosure, the UE may be configured with the required leading time by the BS for each or all of the antenna panel statuses.

In some implementations of the present disclosure, the antenna panel status may contain information about how many antenna panels at the UE are used for performing the data reception/transmission of the channel/RSs, or how many antenna panels at the UE are used/active/turned on in a particular time period.

In some implementations of the present disclosure, an indicator for antenna panel status may be transmitted by the BS to indicate to a UE whether to enable/disable a power saving mode or a normal power consumption mode. In the power saving mode, the UE may turn on a smaller number of antenna panels than that in the normal power consumption mode. For example, the UE may turn on only one antenna panel when operating in the power saving mode and turn on all of its antenna panels when operating in the normal power consumption mode.

It should be noted that the two operation modes (e.g., the power saving mode and the normal power consumption mode) described herein is for illustrative purposes and not intended to limit the present invention. For example, the UE may be operable in a number of operation modes different than two. In addition, if only the power saving mode and the normal power consumption mode are involved in the power control scheme of the UE, the UE may enter the normal power consumption mode when the power saving mode is disabled. In contrast, the UE may enter the power saving mode when the normal power consumption mode is disabled.

In some implementations of the present disclosure, the indicator for antenna panel status information may include a single-bit IE. The UE may enable the power saving mode when the single-bit IE is set to a first value, and disable the power saving mode when the single-bit IE is set to a second value. The total number of turn-on/active antenna panels when the power saving mode is enabled may be less than that when the power saving mode is disabled.

In some implementations of the present disclosure, the indicator for antenna panel status information may include a multiple-bit IE. The UE may be configured to turn on a particular number of the antenna panels when the multiple-bit IE is set to a particular value.

In some implementations of the present disclosure, the indicator for antenna panel status transmitted by the BS may be used for indicating which antenna panel status the UE is to apply.

In some implementations of the present disclosure, if the UE is instructed by the BS to perform data reception using multiple antenna panels when the UE is in the power saving mode, the UE may need to apply a longer leading time than a normal leading time. Hence, in accordance with the present disclosure, some techniques are provided for ensuring that the BS and the UE have the same understanding on the antenna panel status of the UE. In some implementations of the present disclosure, the antenna panel status may be used for indicating, explicitly or implicitly, how many, or which, of the antenna panels of the UE are turned on (or active, or able to transmit and receive data), and/or how many, or which, of the antenna panels of the UE are turned off (or inactive, or not able to transmit and receive data).

In some implementations of the present disclosure, the antenna panel status of a UE may be affected by Bandwidth Part (BWP) related operations. The UE may enable the power saving mode or the normal power consumption mode based on whether the UE operates in a particular BWP. For example, when the UE operates on a default, an initial, or a first active DL/UL BWP, the UE may always enable the normal power consumption mode or the power saving mode.

In some implementations of the present disclosure, before the UE receives an RRC configuration/a MAC-CE message/a DCI message for setting the UE's antenna panels status, the UE may operate in the power saving mode or the normal power consumption mode. In some implementations of the present disclosure, the UE may apply the power saving mode or the normal power consumption mode for the antenna panels before the UE reports the UE's capability about the antenna panels.

As described above, in some implementations of the present disclosure, the indicator for antenna panel status may be a single bit IE used for indicating whether the UE is in the power saving mode or not. For example, the UE may be configured with an available number of antenna panels for each BWP configuration. Once the UE receives the indicator for antenna panel status (e.g., in the form of a single bit IE) being set to a first value (e.g., the bit value "0"), the UE may turn on only part of the antenna panels to operate in the power saving mode. In contrast, if the indicator for antenna panel status is set to a second value (e.g., the bit value "1"), the UE may turn on all of the antenna panels to enable the normal power consumption mode (or disable the power saving mode).

In some implementations of the present disclosure, the indicator for antenna panel status may be a multiple-bit IE used for indicating the antenna panels status to the UE. For example, if the UE includes four antenna panels (e.g., the antenna panels 102, 104, 106 and 108 shown in FIG. 1), the bit field of the indicator for antenna panel status may be set as "00" to indicate that all of the antenna panels are turned off/inactive, or set as "01" to indicate that only one antenna panel is active, or set as "10" to indicate that only two antenna panels are active, or set as "11" to indicate that all antenna panels are active. While the indicator for antenna panel status described herein is used to indicate to the UE to turn on a particular number of antenna panels, there are other ways to use the indicator for antenna panel status in some implementations of the present disclosure. For example, the indicator for antenna panel status may be used to indicate to the UE to turn on/off which one or ones of the antenna panels. In addition, it should be noted the examples described herein are not intended for limiting the present invention. For example, the indicator for antenna panel status may have a number of bits, with each bit corresponding to a particular antenna panel status.

The indicator for antenna panel status may be transmitted from the BS to the UE via a DCI message, a MAC-CE massage, or through RRC signaling. For example, the indicator for antenna panel status information may be contained in a TCI state ID indicated by the BS. In some implementations of the present disclosure, the value of the indicator for antenna panel status may be updated and transmitted by the UE to the BS via an Uplink Control Information (UCI) message, a MAC-CE massage, or through RRC signaling.

In some implementations of the present disclosure, the RRC configuration that contains the indicator for antenna panel status may be an independent IE configured per UE-basis. For example, the RRC configuration may be the same for one cell or one cell group. In such cases, the RRC configuration may be a cell level or cell group level configuration. In another example, the RRC configuration may be configured in a specific frequency range. For example, the RRC configuration may only exist in the FR2.

In some implementations of the present disclosure, the UE may choose a leading time for beam switching based on the antenna panel status. For example, during an RRC reconfiguration period, or before the UE receives the first RRC configuration (e.g., while the UE attempts to establish an RRC connection after a successful initial access, or while the UE performs an initial access procedure), the UE may apply a default value of the leading time. Such default value may be predefined in the 3GPP technical specification (e.g., "3 ms" defined in NR Release-15) and determined as the UE's capability for beam switching in the power saving mode. In another example, the UE may apply the longest leading time configured in a UE capability list during this period. In another example, the BS may send an indicator to the UE through an RRC configuration (e.g., powerPrefIndicationConfig), and the UE may transmit or report the current antenna panel status to the BS via another indicator (e.g., powerPrefIndication). For example, the UE may transmit an antenna panel status report to inform the BS of a change in the antenna panel status. For example, the antenna panel status report may be contained in a beam report or a Channel State Information (CSI) report. In some implementations of the present disclosure, the antenna panel status report may include a single-bit IE. The UE may set the single-bit IE to a first value to indicate that a power saving mode is enabled and set the single-bit IE to a second value to indicate that the power saving mode is disabled. In some implementations of the present disclosure, the antenna panel status report may include a multiple-bit IE. The UE may set the multiple-bit IE to a particular value when a particular number of the plurality of antenna panels are turned on.

In some implementations of the present disclosure, the BS may keep the antenna panel status report from the UE and adjust the scheduling offset based on the antenna panel status report. In some implementations of the present disclosure, the BS may configure the UE with a prohibit timer to prevent the UE from reporting the antenna panel status too frequently. The prohibit timer may be used when the UE reports the antenna panel status to the BS through the RRC message(s), MAC-CE massage(s) or DCI message(s). In some implementations of the present disclosure, the prohibit timer may start at the first subframe/slot/OFDM symbol after the UE reports the antenna panel status. For example, the prohibit timer may start at the first subframe/slot/OFDM symbol after a physical resource (e.g., a Physical Uplink Control Channel (PUCCH) or a Physical Uplink Share Channel (PUSCH)) that contains of the antenna panel status report of the UE. In addition, in some implementations of the present disclosure, the UE may not report another antenna panel status when the prohibit timer is running.

In some implementations of the present disclosure, the prohibit timer may be bidirectional. For example, the prohibit timer may start when the antenna panel status transition from the normal power consumption mode to the power saving mode, and vice versa. In some implementations of the present disclosure, the prohibit timer may be unidirectional. For example, the prohibit timer may only start when a specific power preference transition occurs (e.g., transitioning from the power saving mode to the normal power consumption mode). In some implementations of the present disclosure, the prohibit timer may be configured separately for different kinds of power preference transitions.

In some implementations of the present disclosure, the BS may configure multiple antenna panel status to a UE via an RRC configuration, and the BS may indicate one of the multiple antenna panel status through a MAC-CE message (e.g., which is called a "MAC-CE approach"). For example, if the UE is configured with four antenna panel statuses by the RRC configuration, the BS may send a MAC-CE message to indicate to the UE to use one of these four antenna panel statuses. In addition, the BS may assume that the UE may follow the leading time for the indicated antenna panel status during the time period between the reception of the MAC-CE message and the reception of another MAC-CE message that contains an indicator for antenna panel status for switching the antenna panel status.

In some implementations of the present disclosure, the UE may maintain multiple leading time values configured by the BS or predefined in the 3GPP technical specification. These leading time values may be cell-specific values or cell group-specific values.

In some implementations of the present disclosure, after the UE receives the RRC configuration, but before receiving a MAC-CE massage for activation, the UE may apply one of the leading time values configured in an RRC configuration (if the leading time values are configured in the RRC configuration by the BS) as a default value of the leading time.

In some implementations of the present disclosure, more than one antenna panel status may be collected in a list of entries. For example, each of the entries may refer to a particular antenna panel status, and each antenna panel status may be associated with a particular leading time value.

In some implementations of the present disclosure, the default value of the leading time may refer to the first entry (e.g., the entry indexed by "0") in the list of entries in the RRC configuration. In some implementations of the present disclosure, the default value of the leading time may refer to an entry for the longest leading time in the RRC configuration (if the leading time value is RRC-configured).

In some implementations of the present disclosure, a MAC-CE massage containing a number of zero bits may be used. This MAC-CE massage may be used for turning on (or "enabling") or turning off (or "disabling") the power saving mode. The UE may distinguish this MAC-CE massage based on, for example, a Logical Channel Identity (LCID).

In some implementations of the present disclosure, at least one of the following items may be included in a MAC-CE massage: a cell Identity (ID), a BWP ID, and an indicator for antenna panel status. The UE may apply an antenna panel status indicated by the MAC-CE message after the UE transmits an HARQ-ACK to the BS.

In some implementations of the present disclosure, the BS may configure multiple antenna panel statuses to a UE via an RRC configuration, and the BS may indicate one of the multiple antenna panel statuses through a DCI message (e.g., which is called a "DCI approach"). For example, if the UE is configured with eight different antenna panel statuses in the RRC configuration, the BS may transmit a DCI message which may contain an indicator for antenna panel status to the UE to indicate to the UE to use one of the eight antenna panel statuses in the RRC configuration.

In some implementations of the present disclosure, if a UE is configured with multiple leading time values by the BS, the UE may apply one of the leading time values contained in an RRC configuration as a default leading time value after the UE receives the RRC configuration (but before receiving the DCI message). Similar to the MAC CE approach, the default leading time value may refer to the first entry of the multiple antenna panel statuses in the RRC configuration (e.g., the entry with an index value of "0"), or an entry with the longest leading time in the RRC configuration.

In some implementations of the present disclosure, the BS may use a MAC-CE message to select a subset of the leading time values from the RRC configuration and indicate one of the selected leading time value(s) by a DCI message. For example, the BS may configure 16 antenna panel statuses in an RRC configuration, and the BS may transmit a MAC-CE massage to select four of these 16 antenna panel statuses in the RRC configuration. The BS may further transmit a DCI message to indicate to the UE to use one of the four selected antenna panel statuses.

In some implementations of the present disclosure, irrespective of where the leading time values are configured, the BS may need to ensure that the triggering/scheduling offset for the DL/UL channels/signals can fulfill the requirement of leading time for switching the antenna panel status. From UE's perspective, the UE may not be expected to receive data from the BS during the scheduling offset period.

In some implementations of the present disclosure, the antenna panel status may be associated with the TCI states. For example, in addition to the QCL information, some TCI states may further contain the antenna panel status (e.g., which is indicated by an explicit bit). In addition, the maximum number of the TCI states in an RRC configuration, or a DCI message, may be expanded since the BS may need more TCI state(s) to indicate different antenna panel statuses for the same QCL information. For example, if the maximum number of TCI states is expanded from 64 to 96, the TCI state #63 may be used to represent a signal-antenna-panel status which is QCLed with the CSI-RS resource #1, and the TCI state #64 may be used to represent a multi-antenna-panel status which is QCLed with the same CSI-RS resource #1. In some implementations of the present disclosure, once the QCL information of a DL/UL RS/channel is configured with a TCI state (e.g., the TCI state #64) for multiple antenna panels, the UE may attempt to receive/transmit the DL/UL RS/channel based on a leading time for beam switching for the multiple antenna panels.

In some implementations of the present disclosure, a TCI state table may be used when the UE performs data reception/transmission by multiple antenna panels. For example, the BS may configure the UE with multiple TCI state tables. The number of entries in each TCI state table may be the same or different. The UE may select a specific TCI state table from these TCI state tables based on a MAC-CE massage (e.g., used in the MAC-CE approach) or a DCI message (e.g., used in the DCI approach). For example, if the UE receives a DCI message which contains an explicit bit (e.g., used as an indicator for antenna panel status) for indicating the UE to enable the power saving mode, the UE may attempt to receive the PDSCH using a single antenna panel, instead of using multiple antenna panels. In addition, the UE may further apply a leading time corresponding to using the single antenna panel.

In some implementations of the present disclosure, a timer may be used to determine the switch of the antenna panel status. For example, the UE may receive a timer from the BS and switch the antenna panel status from a first antenna panel status to a second antenna panel status after the timer expires. For example, when the timer expires, the UE may transition from the normal power consumption mode (e.g., in which the UE turns on N2 antenna panels) to the power saving mode (e.g., in which the UE turns on N1 antenna panel(s), where N1 is less than N2). In another example, the UE may transition from the power saving mode to the normal power consumption mode when the timer expires.

In some implementations of the present disclosure, the timer may expire when a DRX inactivity timer expires or the UE enters a DRX off-period/sleep mode.

Figure 2:
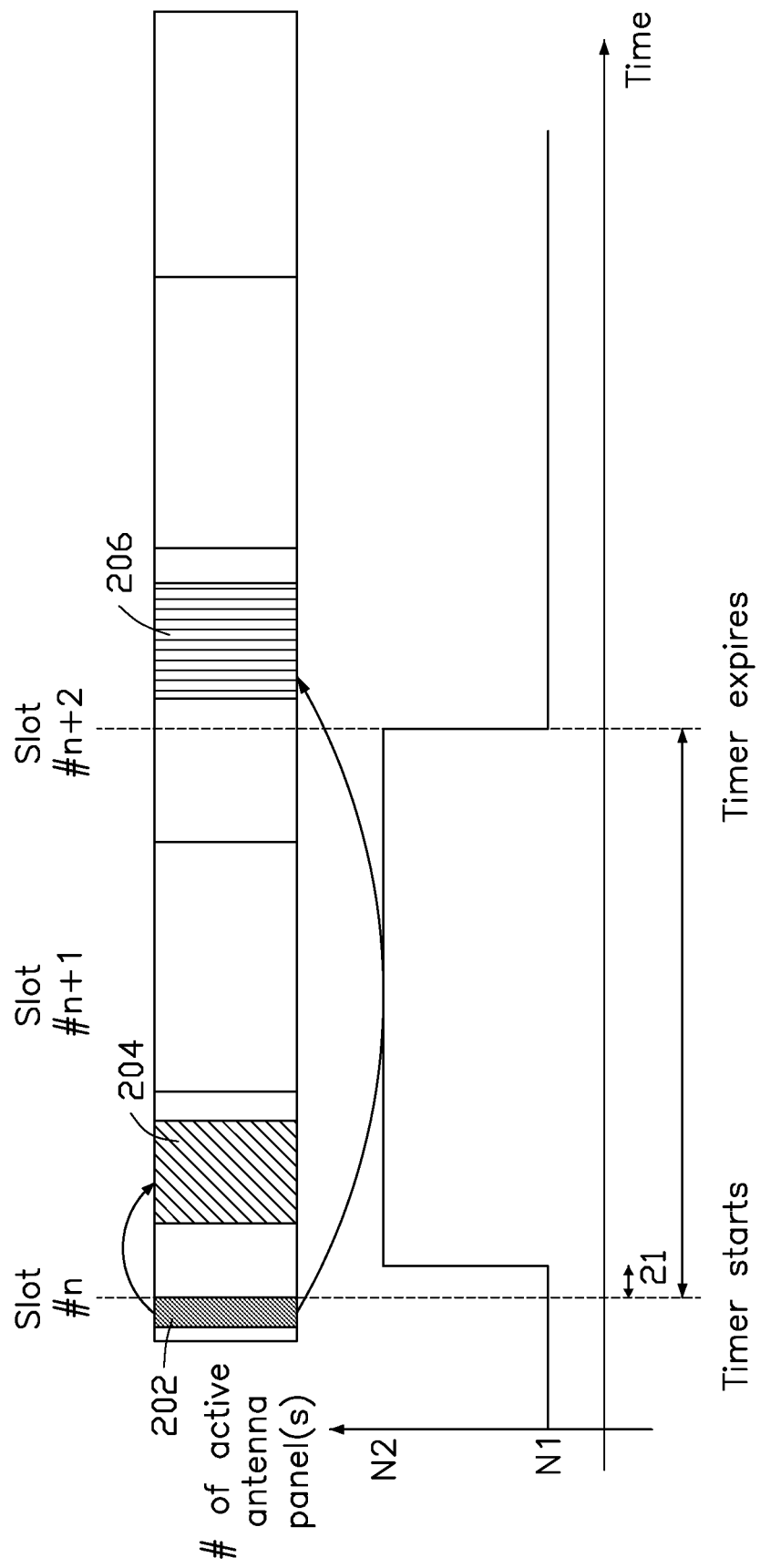
FIG. 2 is a schematic diagram illustrating a timeline of an antenna panel status of a wireless communication device, in accordance with example implementations of the present disclosure.

FIG. 2 is a schematic diagram illustrating a timeline of the antenna panel status of a wireless communication device (e.g., a UE), in accordance with example implementations of the present disclosure.

In the present implementation, a timer for antenna panel status may (re)start at the first symbol after the end of the PDCCH. As shown in FIG. 2, in the slot # n, the UE receives an indicator for antenna panel status via a DCI message which is transmitted over a PDCCH 202. The indicator for antenna panel status may indicate to the UE to switch from a power saving mode (in which there are only N1 antenna panel(s) is active/turned on) to a normal power consumption mode (in which there are N2 antenna panels are active/turned on), where N2 is greater than N1.

As shown in FIG. 2, there is a time gap 21 between the time the UE receives the indicator for antenna panel status from the PDCCH 202 and the time the UE actually turns on the N2 antenna panels. The time gap 21 may reflect the time required for the UE to turn on the antenna panel(s). In some implementations of the present disclosure, the time gap 21 may be deemed as the leading time for beam switching of the UE.

In some implementations of the present disclosure, the UE may start the timer for antenna panel status at the first symbol after the last symbol of the PDCCH 202 monitor occasion. Also, the UE may further receive a PDSCH 204 scheduled by the PDCCH 202 in the same slot # n.

Before the timer expires, the BS may assume that the UE may keep the antenna panel status indicated by the PDCCH 202, or applied for the PDSCH 204. Once the timer expires, the BS may assume that the UE may return to the power saving mode. As shown in FIG. 2, in the slot # n+2, after the timer expires, the UE may transmit a PUCCH 206 indicated by the PDCCH 202 in the power saving mode.

In some implementations of the present disclosure, if the UE is instructed by the BS to operate in the power saving mode, the timer may not start. In addition, the indicator for antenna panel status may be implemented as any implicit/explicit data structure. For example, the indicator for antenna panel status may include a single-bit IE or a multiple-bit IE or may be contained in a beam report or a CSI report.

Figure 3:
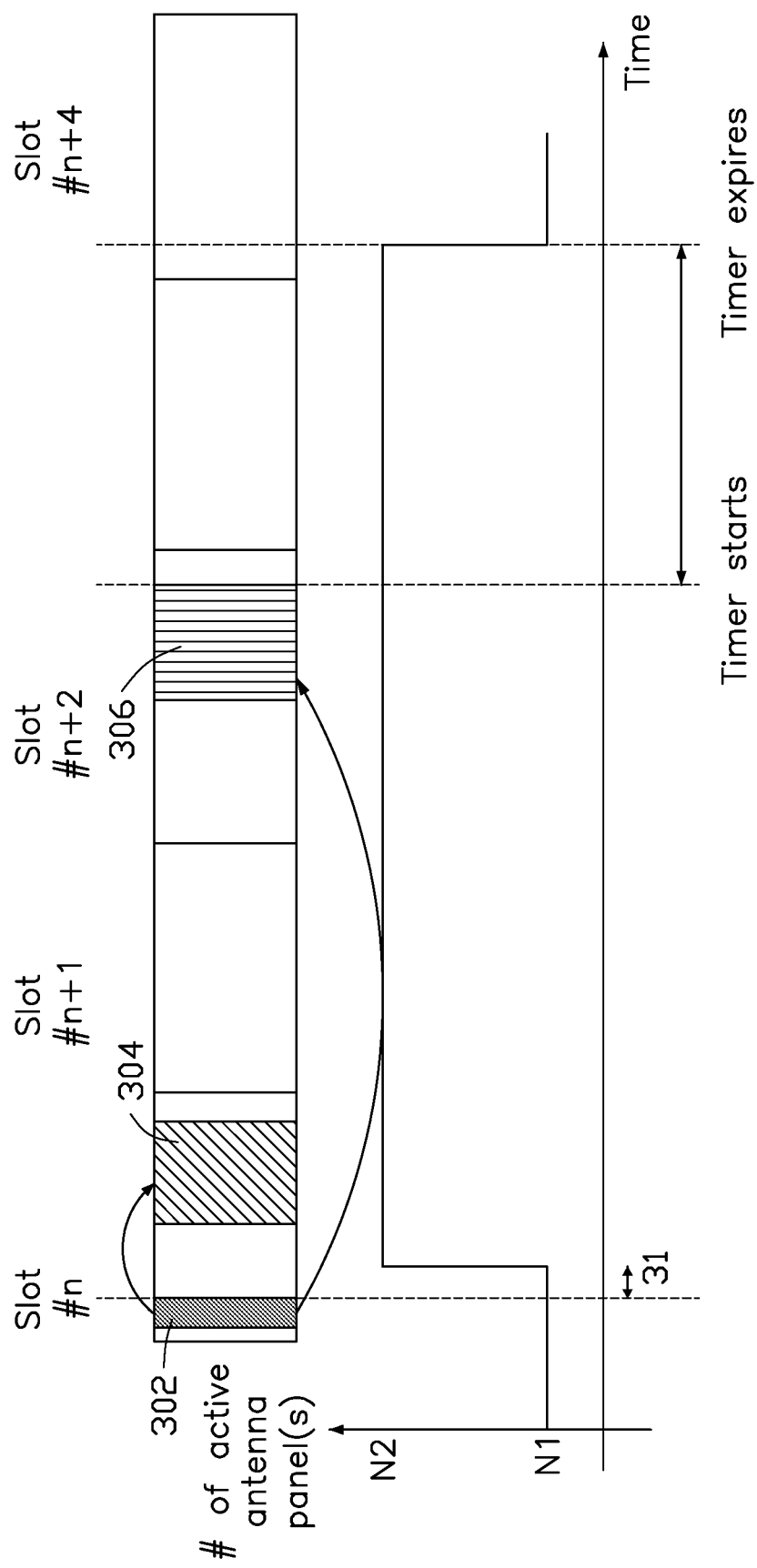
FIG. 3 is a schematic diagram illustrating a timeline of an antenna panel status of a wireless communication device, in accordance with example implementations of the present disclosure.
Figure 4:
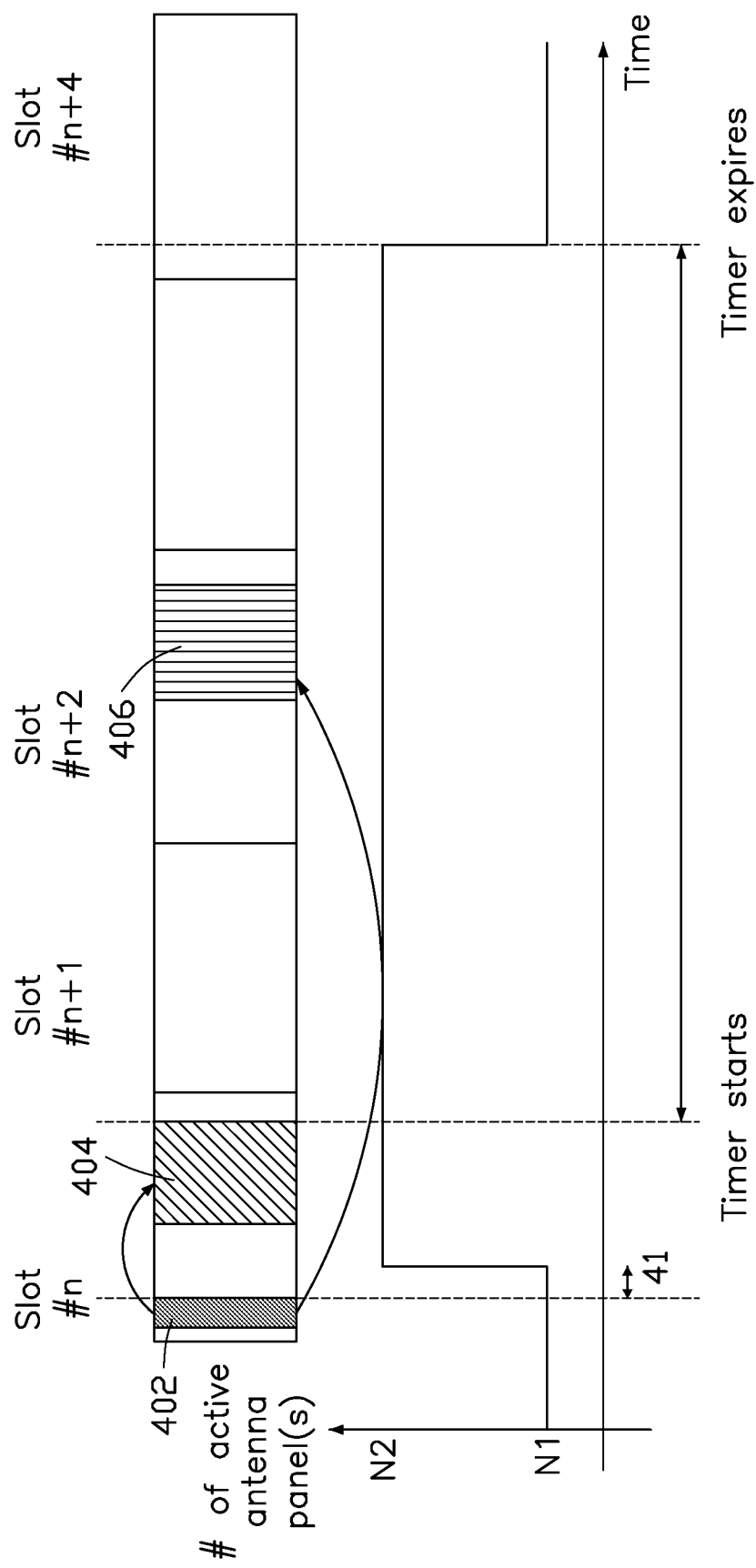
FIG. 4 is a schematic diagram illustrating a timeline of an antenna panel status of a wireless communication device, in accordance with example implementations of the present disclosure.

In some other implementations of the present disclosure, the timer for antenna panel status may start at different time points, as shown in FIGS. 3 and 4.

FIG. 3 is a schematic diagram illustrating a timeline of the antenna panel status of a wireless communication device (e.g., a UE), in accordance with example implementations of the present disclosure. In the present implementation, the timer for antenna panel status may start at the first symbol after the end of a PUCCH. As shown in FIG. 3, in the slot n, the UE receives an indicator for antenna panel status via a DCI message which is transmitted over a PDCCH 302. The UE may further receive a PDSCH 304 which is scheduled by the PDCCH 302 in the same slot # n.

The indicator for antenna panel status may indicate to the UE to switch from a power saving mode (in which there are only N1 antenna panel(s) is turned on) to a normal power consumption mode (in which there are N2 antenna panels are turned on, where N2 is greater than N1). As shown in FIG. 3, there is a time gap 31 between the time the UE receives the indicator for antenna panel status from the PDCCH 302 and the time the UE actually turns on the N2 antenna panels. As described above, the time gap 31 may reflect the time required for the UE to turn on the antenna panel(s). In addition, the time gap 31 may be deemed as the leading time for beam switching of the UE.

In the present implementation, the UE may start the timer at the first symbol after the last symbol of a PUCCH 306 monitor occasion. Similar to the implementations provided with reference to FIG. 2, before the timer expires, the BS may assume that the UE may keep the antenna panel status indicated by the PDCCH 302, or applied for the PDSCH 304. Once the timer expires, the BS may assume that the UE may return to the power saving mode. As shown in FIG. 3, in the slot # n+4, after the timer expires, the UE may turn off (N2−N1) antenna panels to go back to the power saving mode.

FIG. 4 is a schematic diagram illustrating a timeline of the antenna panel status of a wireless communication device (e.g., a UE), in accordance with example implementations of the present disclosure. In the present implementation, the timer for antenna panel status may start at the first symbol after the end of a PDSCH. As shown in FIG. 4, in the slot # n, the UE may receive an indicator for antenna panel status via a DCI message which is transmitted over a PDCCH 402. The UE may further receive a PDSCH 404, which is scheduled by the PDCCH 402 in the same slot # n. Then, the UE may transmit a PUCCH 406, which is indicated by the PDCCH 402, in the slot # n+2.

The indicator for antenna panel status may indicate to the UE to switch from a power saving mode (in which there are only N1 antenna panel(s) is turned on) to a normal power consumption mode (in which there are N2 antenna panels are turned on, where N2 is greater than N1). As shown in FIG. 4, there is a time gap 41 between the time the UE receives the indicator for antenna panel status from the PDCCH 402 and the time the UE actually turns on the N2 antenna panels. As noted above, the time gap 41 may reflect the time required for the UE to turn on the antenna panel(s). In addition, the time gap 41 may be deemed as the leading time for beam switching of the UE.

As described above, the UE may start the timer at the first symbol after the last symbol of the PDSCH 404. Before the timer expires, the BS may assume that the UE may keep the antenna panel status indicated by the PDCCH 402 or applied for the PDSCH 404. Once the timer expires, the BS may assume that the UE may return to the power saving mode. As shown in FIG. 4, in the slot # n+4, after the timer expires, the UE may turn off certain antenna panel(s) to transition to the power saving mode.

The timer for antenna panel status may count based on an absolute time unit (e.g., ms), a time slot, a subframe, or an OFDM symbol. In some implementations of the present disclosure, if the timer counts based on a time slot or an OFDM symbol, the numerology of the time unit may be determined based on the PDCCH which carries the scheduling information, or based on the PDSCH/RSs/PUSCH/PUCCH which is scheduled by the PDCCH.

In some implementations of the present disclosure, the timer for antenna panel status may be an optional feature for the UE. For example, the BS may decide whether to configure the timer to the UE based on the UE's capability. In addition, if the UE is not configured with the timer for antenna panel status, the UE may not automatically switch the antenna panel status (e.g., return to the power saving mode automatically). In such a case, the UE may follow the most recently received indicator for antenna panels status (e.g., contained in a DCI message, a MAC-CE massage, or an RRC configuration) from the BS to determine the antenna panels status, until the UE sends a request to the BS and/or receives another indicator for antenna panels status from the BS. In some implementations of the present disclosure, the BS may not configure the UE with the timer for antenna panel status. In such a case, if the BS does not receive a response to the indicator for antenna panel status from the UE, the BS may assume that the UE is in the power saving mode. Hence, the BS may assume that a longer leading time may be adopted by the UE, and the BS may determine a scheduling offset value for the UE based on this assumption.

Some implementations of the present disclosure are described herein for determining the scheduling offset values and the leading time values for different antenna panel statuses.

In some implementations, there is only one leading time value for each DL/UL channel/RSs reception/transmission. Such a leading time value may be defined by the UE's capability for example. However, the above-mentioned mechanism may not be suitable for a situation where the UE needs a longer leading time for beam switching. Although the BS may configure the UE with a scheduling offset that is long enough to fulfill various leading times of different antenna panel statuses, such a configuration may cause some scheduling restrictions (e.g., because the UE may not always need to use a long leading time). Hence, in accordance with some implementations of the present disclosure, some techniques are provided to improve scheduling flexibility and performance of beam switching. For example, all DL/UL channel/RSs may be configured with one or more additional scheduling/triggering offset values for the situations where the UE may need to apply a long leading time value for beam switching, such as a PDSCH scheduling offset, a CSI-RS resource reception, a PUSCH transmission, and an SRS antenna switch.

In some implementations of the present disclosure, multiple scheduling offset values may be predefined for the UE (e.g., based on the 3GPP technical specification) or contained in the RRC configuration. The UE may apply one of the scheduling offset values based on the indicator for antenna panels status received from the BS. For example, the UE may apply a first scheduling offset value for a normal leading time case (e.g., in which the UE may not require to turn on an antenna panel, or only need to turn N1 antenna panel(s)), and apply a second scheduling offset value for a long leading time case (e.g., in which UE may need to turn on all of the antenna panels, or need to turn N2 antenna panels, where N2 is greater than N1).

In some implementations of the present disclosure, the UE may receive a plurality of scheduling offset values (e.g., including the first scheduling offset value and the second scheduling offset value) from the BS. Each of the scheduling offset values may be used for indicating a time duration counting from an end of a PDCCH to a beginning of a PDSCH. The UE may receive a first DCI message for setting the antenna panel status to a first antenna panel status. In response to receiving the first DCI message, the UE may apply the first scheduling offset value to receive first information on a DL channel (e.g., a PDSCH) scheduled by the first DCI message. The UE may further receive a second DCI message for switching the antenna panel status from the first antenna panel status to a second antenna panel status. For example, the second DCI message may include an indicator for antenna panel status information. In response to receiving the second DCI message, the UE may apply the second scheduling offset value to receive second information on a second DL channel (e.g., another PDSCH) scheduled by the second DCI message.

In some implementations of the present disclosure, each DL/UL channel/RS may have its corresponding scheduling offset value. For example, in order to receive an aperiodic CSI-RS resource, the RRC configuration may include two scheduling offset values: one leading time value may be indicated as X1 slot(s) (e.g., one slot) used for a normal leading time case, and another leading time value may be indicated as X2 slots (e.g., three slots) used for a long leading time case, where X2 is greater than X1. The UE may select one of these scheduling offset values based on the indicator for antenna panel status received from the BS. In another example, in order to receive the PDSCH, the RRC configuration may include two scheduling offset values (e.g., the K0 parameters/values in the pdsch-TimeDomain-ResourceAllocationList IE). For example, one scheduling offset value (K0) may be indicated as X1 slot(s) for the normal leading time case, and another scheduling offset value (K0) may be indicated as X2 slots for the long leading time case. The UE may select one of the scheduling offset values based on the indicator for antenna panel status.

In some implementations of the present disclosure, the UE may receive a scheduling offset value from the BS. The scheduling offset value may include at least one of a K0 parameter/value for a DL channel (e.g., a PDSCH) and a K2 parameter/value for a UL channel (e.g., a PUSCH). If the time duration indicated by the scheduling offset value is less than the leading time duration indicated by a selected leading time value, the UE may further determine that the scheduling offset value is invalid.

In some implementations of the present disclosure, all of the DL/UL channel/RSs may apply the same leading time value for beam switching. For example, when the UE operates in the normal power consumption mode, the PUSCH transmission may be associated with a specific scheduling offset value that is used for the normal leading time case (e.g., a K2 value for determining a PUSCH transmission offset). On the other hand, the PDSCH transmission may be associated with another scheduling offset also for the normal leading time case (e.g., a K0 value for determining a PDSCH reception offset).

In contrast, when the UE operates in the power saving mode, both the PUSCH transmission and the PDSCH reception may apply the same scheduling offset value. This scheduling offset value may be predefined by the 3GPP technical specifications, or configured in the RRC configuration, or determined based on the UE's capability. In some other implementations of the present disclosure, all DL channels/RSs may apply a first scheduling offset value suitable for the long leading time case, while all UL channels/RSs may apply a second scheduling offset value also suitable for the long leading time case, where the first scheduling offset value and the second scheduling offset value may be different. In some of the present implementations, all of the DL/UL channels/RSs may be configured with an additional leading time value for a beam switch case (e.g., a PDSCH scheduling offset, a CSI-RS resource reception, a PUSCH transmission or an SRS antenna switch).

Some implementations of the present disclosure are described herein for providing techniques for helping the BS to acquire information about the antenna panel status of the UE.

In some implementations of the present disclosure, the CSI measurement/report obtained under different antenna panel statuses may be transmitted from the UE to the BS via UCI/MAC-CE messages. In the UCI case, there may be at least two ways for the UE to inform the BS of the antenna panels status. One way is to introduce a particular IE contained in the CSI report, and the other way is to reuse the reserved bit field of an IE contained in the CSI report. In addition, the UE may transmit a CSI parameter to the BS for reporting the antenna panel status. The CSI parameter may include at least one of a Precoding Matrix Indicator (PMI), a Channel Quality Indicator (CQI), a Rank Indication (RI), a Layer Indication (LI), and a Layer 1 Reference Signals Received Power (L1-RSRP).

The information used to help the BS to acquire the antenna panel status of the UE may be referred to as the UE assistance information. In some implementations of the present disclosure, the UE may transmit the UE assistance information to the BS if the UE is not configured with the timer for antenna panel status, or does not have the ability to use the timer. In some implementations of the present disclosure, the UE may transmit the UE assistance information to the BS if the UE is configured to (or have the ability to) switch its antenna panel status only when receiving the indicator for antenna panel status via a MAC-CE massage and/or an RRC message.

An example L1-RSRP report quantized table is shown as follows:

TABLE 1

| Bits | RSRP range |
| --- | --- |
| 0000000 | RSRP ≥ −44 dBm |
| 0000001 | −44 dBm > RSRP ≥ −45 dBm |
| 0000010 | −45 dBm > RSRP ≥ −46 dBm |
| . . . | . . . |
| 1100000 | −139 dBm > RSRP ≥ −140 dBm |
| 1100001 | −140 dBm > RSRP |
| 1100011 | Antenna panel status #0 |
| 1100100 | Antenna panel status #1 |
| . . . | . . . |
| 1111111 | Reserved |

As shown in Table 1, a number of the reserved bit fields (e.g., bit fields "1100011" and "1100100") in the L1-RSRP report quantized table are reused for indicating the antenna panel status. For example, if the UE reports a value of "1100011" as the largest L1 RSRP value in the L1-RSRP report, the BS may assume that the UE is in the power saving mode.

In some implementations of the present disclosure, if the UE is configured to perform a group-based beam reporting procedure (e.g., in which the UE may receive signals simultaneously via a group of RX beams), the antenna panel status of the UE may be indicated by an L1-RSRP related value (e.g., a reserved L1-RSRP value and/or a specific differential L1-RSRP value). For example, if the bit field for the largest L1-RSRP value is a reserved value (e.g., "1100011") and the differential L1-RSRP value is a special value (e.g., "0000"), the BS may assume that the UE is in the power saving mode or in a specific antenna panel status, as shown in Table 1.

In some implementations of the present disclosure, the BS may assume that the indicated antenna panel status will be applied by the UE from the first symbol after the end of the slot at which the UCI or the PUSCH of the MAC-CE massage is transmitted through. For example, if the UE is configured with a timer for antenna panel status (e.g., the timer described with reference to FIGS. 2, 3 and 4), this timer may start at the first symbol after the end of the slot at which the UCI or the PUSCH of the MAC-CE massage is transmitted through.

In some implementations of the present disclosure, the mechanisms described above can be applied for the cases that the BS configures the UE to measure the CSI-RS resource/SSB by a single antenna panel, whereas the UE is actually able to (or has to) apply multiple antenna panels in the time resource for receiving the CSI-RS resource/SSB. In some implementations of the present disclosure, the UE may indicate the antenna panel status to the BS via the CSI parameter of the CSI report.

In some implementations of the present disclosure, the UE may report multiple sets of CSI parameters to the BS. For example, among the multiple sets of CSI parameters, one set of the CSI parameters may include CSI parameter(s) received and obtained through a single antenna panel, while another set of the CSI parameters may include CSI parameter(s) received and obtained through multiple antenna panels.

In some implementations of the present disclosure, techniques are described herein for determining the antenna panel status of a UE based on a DRX operation.

The DRX operation is a mechanism that makes a UE discontinuously monitor/receive the PDCCH to reduce the power consumption of the UE. However, when performing the DRX operation, the UE may still need to monitor a number of RSs in a DRX off-duration or a DRX inactive period. Hence, in some implementations of the present disclosure, whether to enable the power saving mode at a UE may be determined based on the DRX operation.

In some implementations of the present disclosure, a UE may decide to operate in the power saving mode when the UE is in a DRX off-duration or a DRX inactive period. For example, a UE may enable the power saving mode when the UE operates in a DRX active time (or a DRX on-duration) and disable the power saving mode when the UE operates in a DRX inactive time (or a DRX off-duration).

In some implementations of the present disclosure, whether to operate in the power saving mode is independent of the DRX operation. For example, a UE may only follow the indicator for antenna panel status received from the BS, without considering whether the UE is currently in a DRX on-duration or the DRX off-duration.

In some implementations of the present disclosure, whether to operate in the power saving mode may be determined based on the length of a DRX cycle (e.g., a time gap between two UE-wake-up instances). For example, the UE may be configured with a particular threshold and determine whether to enable the power saving mode according to a comparison between the threshold and the length of the DRX period. For example, if the threshold is 50 ms and the UE is configured with a DRX period of 40 ms, then the UE may not enable the power saving mode because the length of the DRX period (40 ms) is less than the threshold (50 ms). In the same way, if the UE is configured with a DRX period of 60 ms, the UE may enable the power saving antenna status because the length of the DRX period (60 ms) is greater than the threshold (50 ms). This threshold may be predefined in the 3GPP technical specifications or configured by the BS via an RRC signaling.

In some implementations of the present disclosure, the UE may assume that it will not operate in the power saving mode if the UE is in the active time. For example, the active time may include the time while: 1) a specific timer (e.g., drx-onDurationTimer or drx-InactivityTimer or drx-RetransmissionTimerDL or drx-RetransmissionTimerUL or ra-ContentionResolutionTime) is running; or 2) a scheduling request is sent on a PUCCH and is pending; or 3) a PDCCH indicating a new transmission addressed to the Cell Radio Network Temporary Identifier (C-RNTI) of the MAC entity has not been received after successful reception of a random access response for the random access preamble not selected by the MAC entity among the contention-based random access preamble.

In some implementations of the present disclosure, the UE may automatically enter/stay the normal power consumption mode regardless of the BS's indication. For example, the UE may automatically switch the antenna panel status without further reception of a new indicator for antenna panel status information from the BS.

In some implementations of the present disclosure, if the UE is configured with a timer for antenna panel status, this timer may be affected by the DRX inactivity timer, because from the UE's perspective, whether to operate in the power saving mode may be related to the DRX operations. For example, when the DRX inactivity timer expires while the timer for antenna panel status is still running, the UE may switch to the DRX off duration and enable the power saving mode. In addition, the timer for antenna panel status may then stop. In another example, the operation of the DRX inactivity timer and the timer for antenna panel status are independent.

An illustrative example (denoted as Example 0) will now be provided, where the UE may inform the BS of the UE's capability.

FIG. 5 is an example of a data structure indicating UE capability information, in accordance with example implementations of the present disclosure. As shown in FIG. 5, UE capability information 502 includes a number of parameters related to the antenna panel status of the UE. The parameters may include at least one of a power saving indicator (which may be used as the indicator for antenna panel status described herein), a timer for antenna panel status (for which the value may be set as "true/support" or "false/not support"), a maximum number of support antenna panels (e.g., one, two, four or eight), a support indication method (e.g., which may indicate whether an RRC, MAC-CE, or DCI approach is supported), a required time for antenna panel status switch (e.g., 1 ms, 2 ms, 3 ms, or 4 ms), and a UE assistance indication (for which the value may be set as "true/support" or "false/not support"). The UE may transmit the UE capability information 502 to the BS after establishing an RRC connection to the BS. If the UE supports the timer for antenna panel status, the BS may configure the length of the timer for antenna panel status to the UE, as shown in FIG. 6.

FIG. 6 is an example data structure indicating the configuration of the timer for antenna panel status, in accordance with example implementations of the present disclosure. As shown in FIG. 6, a configuration 602 may indicate that the length/duration of the timer for antenna panel status is four slots.

An illustrative example (Example 1-1) will now be provided, where the scheduling offset value (e.g., K0 value) for PDSCH reception may be selected based on an indicator for antenna panel status (e.g., contained in a TCI state) from the BS.

Figure 7:
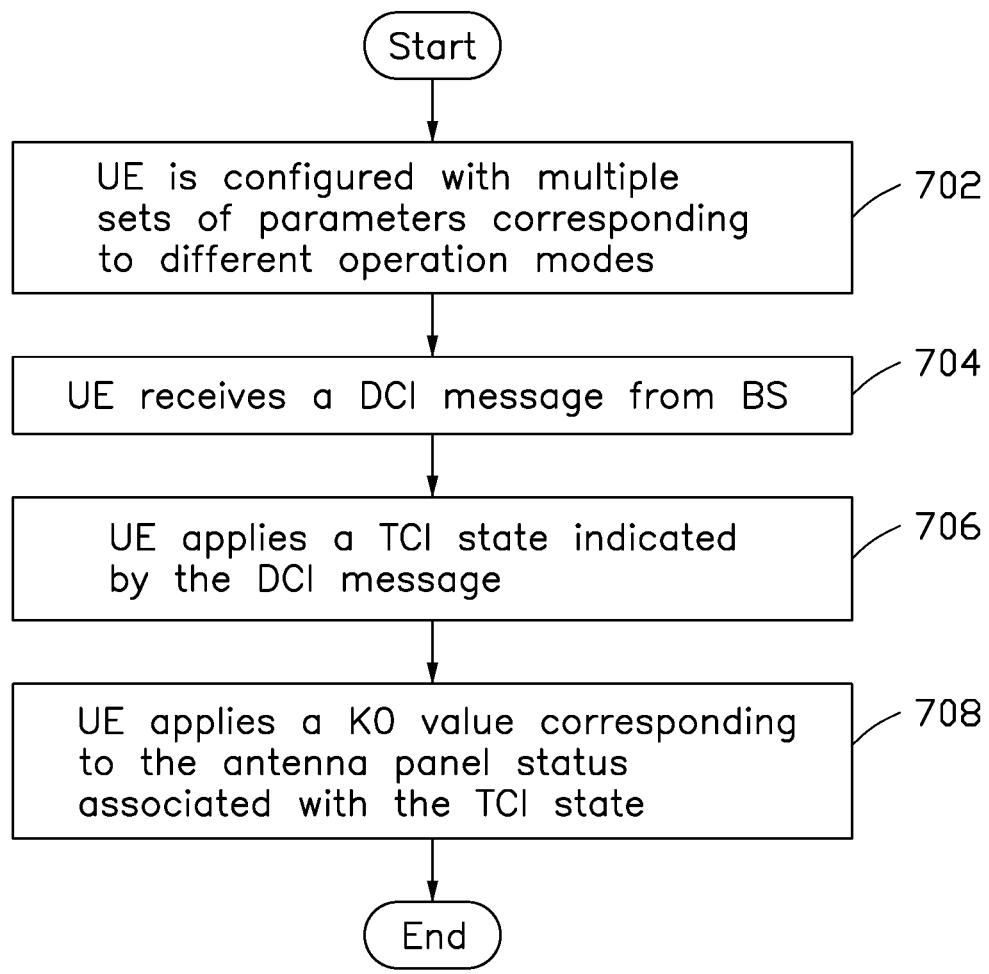
FIG. 7 is a flowchart for a method of selecting a scheduling offset value based on a Transmission Configuration Indicator (TCI) state indicated by a BS, in accordance with example implementations of the present disclosure.

FIG. 7 is a flowchart for a method of selecting a scheduling offset value based on a TCI state indicated by the BS, in accordance with example implementations of the present disclosure.

In action 702, a UE may be configured with multiple sets of parameters corresponding to different operation modes (e.g., the power saving mode and the normal power consumption mode). For example, the UE may be configured with two different leading time values. One leading time value may be 10 μs, and the other one may be 3 ms. As noted above, the UE may apply a first leading time when the UE needs to turn on a first number of antenna panel(s), and apply a second leading time when the UE needs to turn on a second number of antenna panel(s), where the first leading time is longer than the second leading time if the first number is greater than the second number. Hence, in this example, the shorter leading time, 10 μs, may be applied in the case that the UE does not need to further turn on an antenna panel in response to the indicator for antenna panel status, and the longer leading time, 3 ms, may be applied in the case that the UE needs to turn on one or more antenna panels to change the operation mode (e.g., to switch from the power saving mode to the normal power consumption mode).

The leading time values may be predefined in the 3GPP technical specifications or configured by the BS via an RRC signaling. In addition, the UE may be configured with a set of K0 values in the pdsch-TimeDomainResourceAllocationList IE of an RRC configuration. An example of the K0 configuration is as follows.

TABLE 2

| Row index | K0 (normal, long) |
|---|---|
| 0 | (0 slot, 3 slots) |
| 1 | (0 slot, 3 slots) |
| . | . |
| . | . |
| . | . |
| 15 | (1 slot, 4 slots) |

For each indexed row of the K0 configuration, the UE may determine which of the normal K0 value and the long K0 value should be applied. In addition, the UE may be configured with a certain number of TCI state(s) in the RRC configuration, and each of the TCI state(s) may be associated with a particular antenna panel status.

FIG. 8 is an example data structure indicating TCI state configuration, in accordance with example implementations of the present disclosure. As shown in FIG. 8, a TCI state configuration 802 includes 64 TCI states, and each TCI state may include a power saving mode IE for indicating whether to enable the power saving mode when the corresponding TCI state is applied.

In addition, the UE may be configured by the BS to enable the power saving mode via an indicator for antenna panel status. FIG. 9 is an example data structure for an indicator for antenna panel status, in accordance with example implementations of the present disclosure. As shown in FIG. 9, an indicator for antenna panel status 902 includes a power saving mode IE which is set as "true" to indicate to the UE to enable the power saving mode.

It should be noted that the parameter values, data formats, and configurations provided herein are for illustrative purposes only, and not intended to limit the scope of the present invention. For example, the number of slots for each K0 value (e.g., the normal K0 value or the long K0 value) may be different for different numerologies.

Referring back to FIG. 7. In action 704, the UE may receive a DCI message from the BS. In action 706, the UE may apply a TCI state indicated by the DCI message. In action 708, the UE may apply a K0 value corresponding to the antenna panel status associated with the TCI state.

Figure 10A:
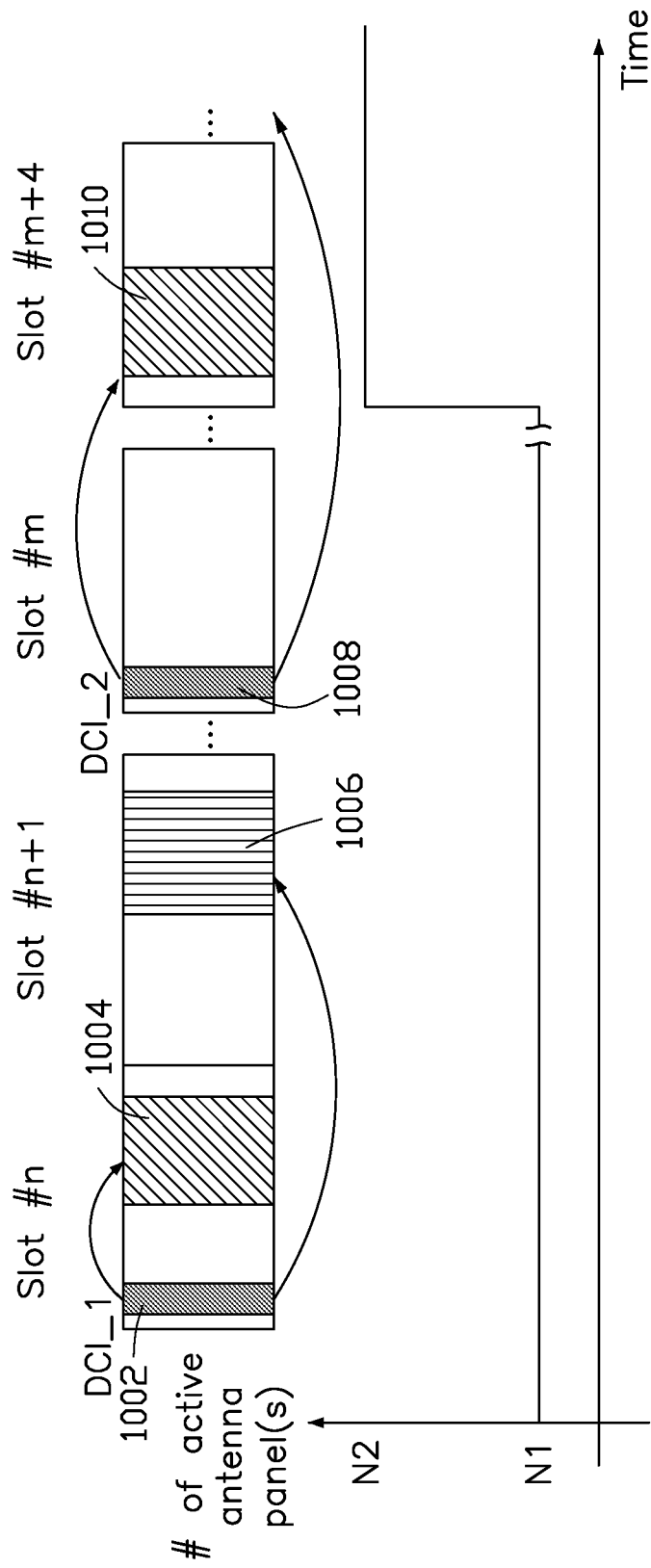
FIGS. 10A and 10B are schematic diagrams illustrating timelines of an antenna panel status of a wireless communication device, in accordance with example implementations of the present disclosure.
Figure 10B:
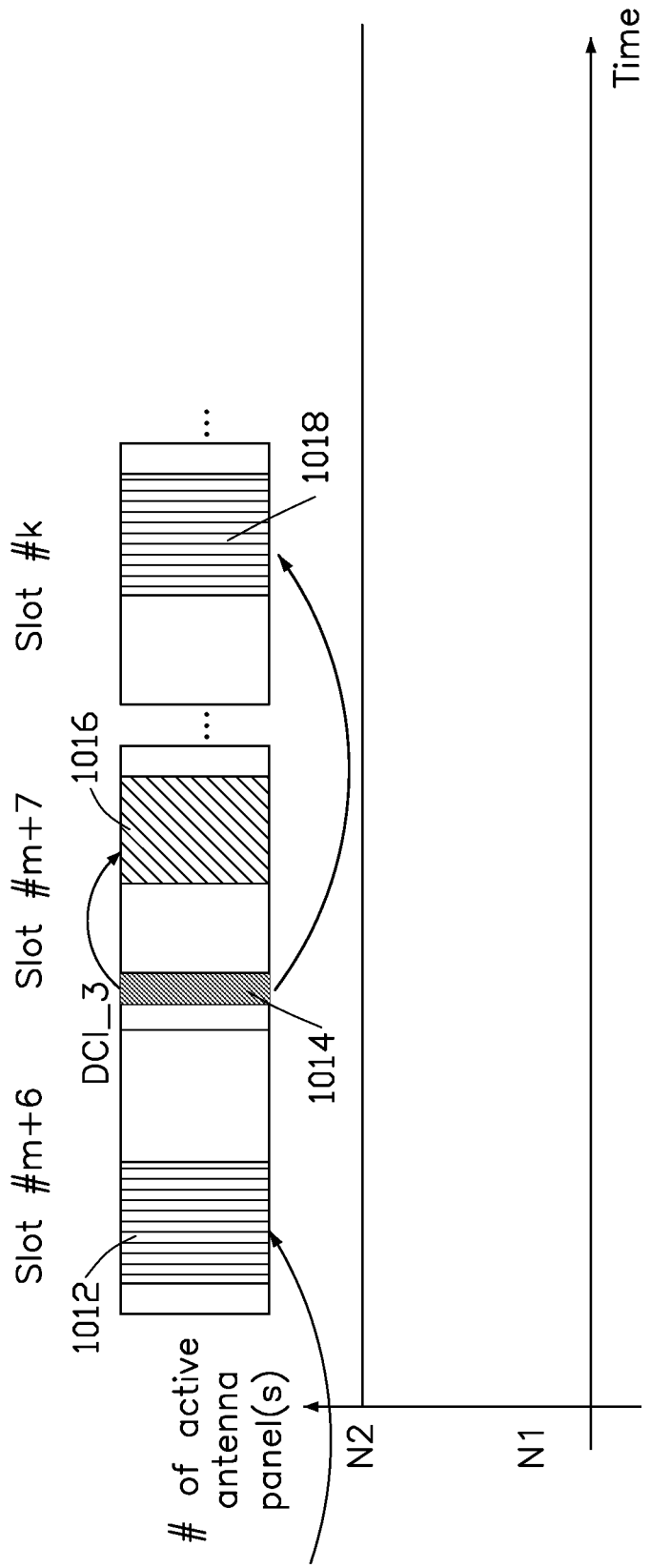

FIGS. 10A and 10B are schematic diagrams illustrating timelines of the antenna panel status of a wireless communication device (e.g., a UE), in accordance with example implementations of the present disclosure. It should be noted that the timeline of FIG. 10B is continued from that of FIG. 10A. In this example, the total number of turned-on/active antenna panels at the UE is N1 when the power saving mode is enabled and is N2 when the power saving mode is disabled, where N1 is less than N2. For example, N1 may be "1" and N2 may be the number of the antenna panels the UE has.

As shown in FIG. 10A, the UE may receive and decode a first DCI message DCI_1 which is transmitted over a PDCCH 1002 in the slot # n. The first DCI message DCI_1 may indicate to the UE to apply a particular TCI state (e.g., the TCI state #1 contained in the TCI state configuration 802 in FIG. 8) for a scheduling PDSCH 1004. According to FIG. 8, because the TCI state #1 includes a power saving mode IE which is configured with a "true" value, the UE may follow the TCI state #1 to monitor the scheduling PDSCH 1004 in the power saving mode. In some implementations of the present disclosure, the UE may apply a normal K0 value when the UE does not need to further turn on an antenna panel in response to the indicator for antenna panel status from the BS, and may apply a long K0 value when the UE needs to turn on at least one antenna panel in response to the indicator for antenna panel status. In this example, because the UE has already in the power saving mode before receiving the first DCI message DCI_1, the UE may refer to the K0 configuration in Table 2 to apply a normal K0 value (e.g., 0 slot) contained in the row entry which is indexed by "1" and associated with the TCI state #1. Once the normal K0 value (e.g., 0 slot) is applied, the UE is expected to receive the PDSCH 1004 in the same slot as the PDCCH 1002, as shown in FIG. 10A.

After successfully receiving and decoding the PDSCH 1004, the UE may transmit a HARQ-ACK over a PUCCH 1006 in the slot # n+1 based on the HARQ resource indicator (ARI) contained in the first DCI message DCI_1. Then, the UE may further receive and decode a second DCI message DCI_2 which is transmitted over a PDCCH 1008 in the slot # m. In this example, the second DCI message DCI_2 may indicate to the UE to apply the TCI state #64 for a scheduling PDSCH 1010. According to FIG. 8, because the TCI state #64 includes a power saving mode IE which is configured with a "false" value, the TCI state #64 may indicate to the UE to receive the scheduling PDSCH 1010 in the normal power consumption mode, in which there are N2 antenna panels turned on by the UE. As noted above, because the UE needs to turn on a number of antenna panels to enter the normal power consumption mode, the UE may apply a long K0 value for receiving the PDSCH 1010. For example, the UE may refer to the K0 configuration in Table 2 to apply a long K0 value (e.g., 4 slots) contained in the row entry which is indexed by "15" and associated with the TCI state #64. Once the long K0 value (e.g., 4 slots) is applied, the UE will expect to receive the PDSCH 1010 in the slot m+4, which is the fourth slot after the slot # m, as shown in FIG. 10A.

After successfully receiving and decoding the PDSCH 1010, the UE may transmit a HARQ-ACK over a PUCCH 1012 in the slot # m+6 based on the ARI contain in the second DCI message DCI_2, as shown in FIG. 10B.

Then, the UE may receive and decode a third DCI message DCI_3 which is transmitted over a PDCCH 1014 in the slot # m+7. In this example the third DCI message DCI_3 may indicate to the UE to apply the same TCI state #64 as indicated in second DCI message DCI_2 for a scheduling PDSCH 1016. Although the TCI state #64 may indicate to the UE to receive the scheduling PDSCH 1016 in the normal power consumption mode, the UE has already operated in the normal power consumption mode before receiving the third DCI message DCI_3. Thus, the UE does not need to further turn on an antenna panel at this moment, and the UE may apply the normal K0 value (e.g., 0 slot) to determine when to receive the PDSCH 1016 (e.g., in the same slot # m+7 as the PDCCH 1014). After successfully receiving and decoding the PDSCH 1016, the UE may transmit a HARQ-ACK over a PUCCH 1018 in the slot # k based on the ARI contained in the third DCI message DCI_3, as shown in FIG. 10B.

An illustrative example (denoted as Example 1-2) will now be provided, where the scheduling offset value (e.g., K0 value) for PDSCH reception may be selected based on the TCI state and the timer for antenna panel status.

In Example 1-2, the UE may be further configured with a timer for antenna panel status in addition to the multiple sets of parameters configured in action 702 of FIG. 7. For example, the configuration of the timer for antenna panel status may be, but not limited to, the configuration 602 in FIG. 6. In some implementations of the present disclosure, the numerology of the timer for antenna panel status may be determined based on the scheduling PDSCH of the active DL BWP.

Figure 11A:
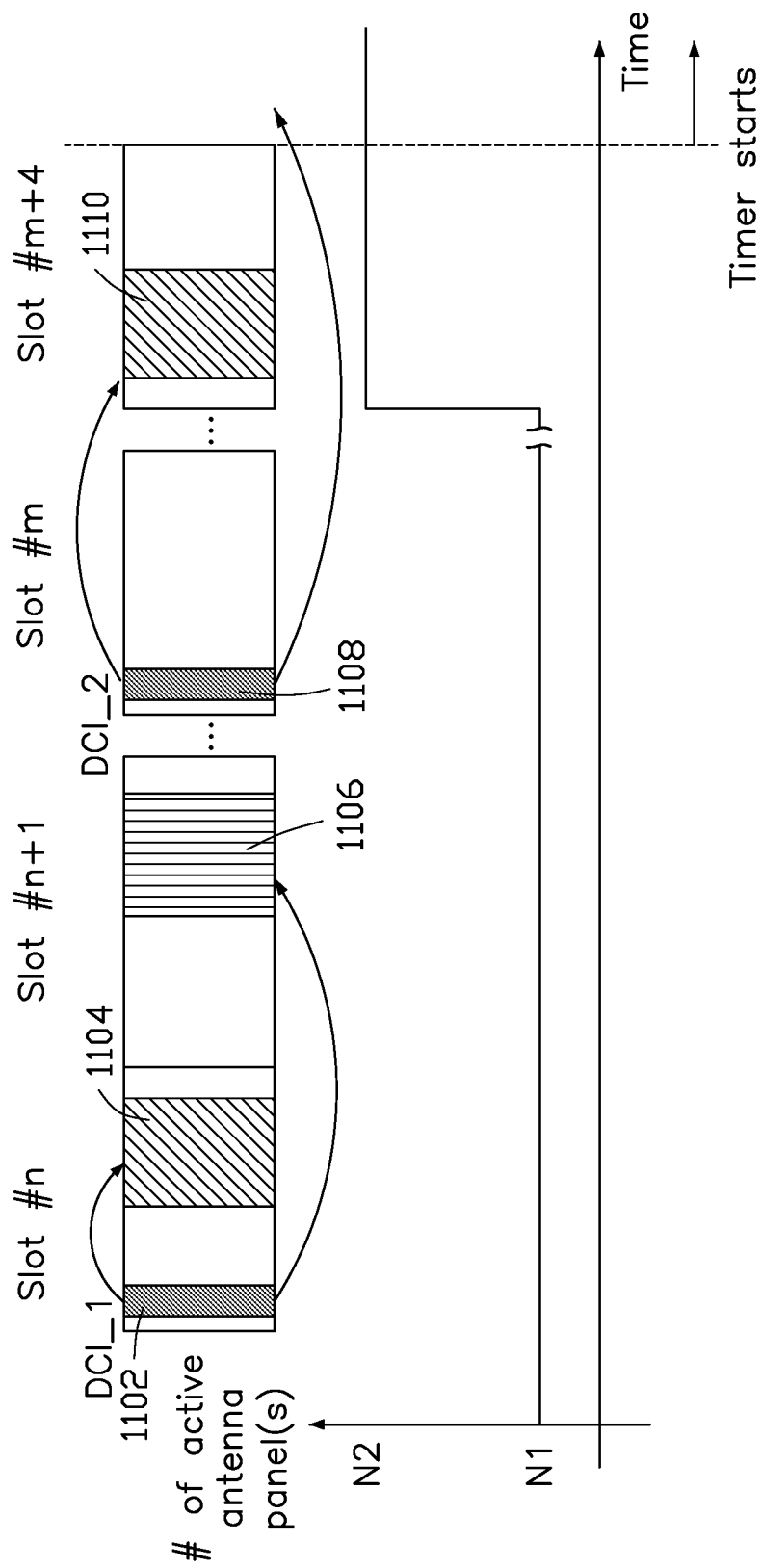
FIGS. 11A and 11B are schematic diagrams illustrating timelines of an antenna panel status of a wireless communication device, in accordance with example implementations of the present disclosure.
Figure 11B:
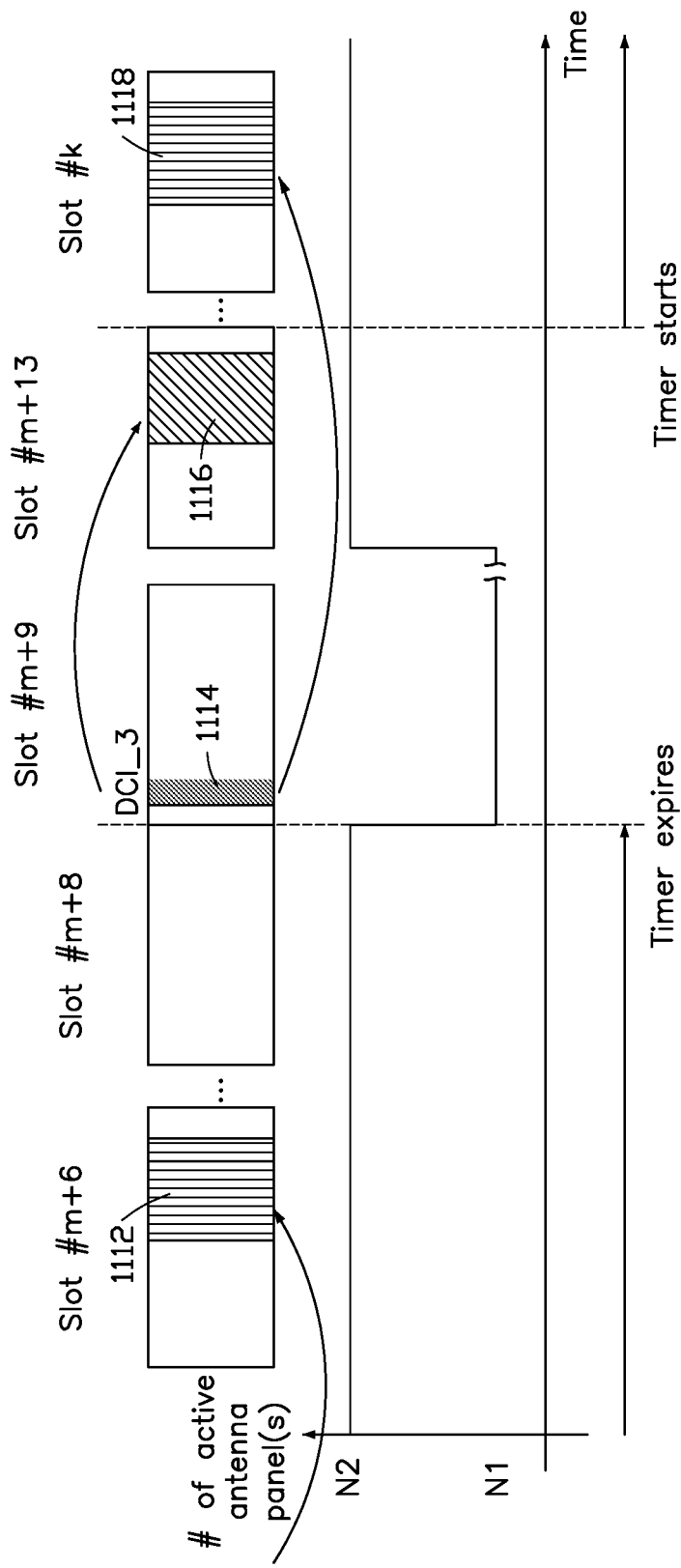

FIGS. 11A and 11B are schematic diagrams illustrating timelines of the antenna panel status of a wireless communication device (e.g., a UE), in accordance with example implementations of the present disclosure. It should be noted that the timeline of FIG. 11B is continued from that of FIG. 11A. In this example, the total number of turned-on/active antenna panels at the UE is N1 when the power saving mode is enabled and is N2 when the power saving mode is disabled, where N1 is less than N2. For example, N1 may be "1" and N2 may be the number of the antenna panels the UE has.

As shown in FIG. 11A, the UE may receive and decode a first DCI message DCI_1 which is transmitted over a PDCCH 1102 in the slot # n. The first DCI message DCI_1 may indicate to the UE to apply a particular TCI state (e.g., the TCI state #1 contained in the TCI state configuration 802 in FIG. 8) for a scheduling PDSCH 1104. According to FIG. 8, because the TCI state #1 includes a power saving mode IE which is configured with a "true" value, the UE may follow the TCI state #1 to monitor the scheduling PDSCH 1004 in the power saving mode. As noted above, because the UE has already in the power saving mode before receiving the first DCI message DCI_1, the UE may refer to the K0 configuration in Table 2 to apply a normal K0 value (e.g., 0 slot) contained in the row entry which is indexed by "1" and associated with the TCI state #1. Once the normal K0 value (e.g., 0 slot) is applied, the UE is expected to receive the PDSCH 1104 in the same slot as the PDCCH 1002, as shown in FIG. 11A.

After successfully receiving and decoding the PDSCH 1104, the UE may transmit an HARQ-ACK over a PUCCH 1106 in the slot # n+1 based on the ARI contained in the first DCI message DCI_1. Then, the UE may further receive and decode a second DCI message DCI_2 which is transmitted over a PDCCH 1108 in the slot # m. In this example, the second DCI message DCI_2 may indicate to the UE to apply the TCI state #64 for a scheduling PDSCH 1110. According to FIG. 8, because the TCI state #64 includes a power saving mode IE which is configured with a "false" value, the TCI state #64 may indicate to the UE to receive the scheduling PDSCH 1110 in the normal power consumption mode, in which there are N2 antenna panels turned on by the UE. As noted above, because the UE needs to turn on a number of antenna panels to enter the normal power consumption mode, the UE may apply a long K0 value for receiving the PDSCH 1110. For example, the UE may refer to the K0 configuration in Table 2 to apply a long K0 value (e.g., 4 slots) contained in the row entry which is indexed by "15" and associated with the TCI state #64. Once the long K0 value (e.g., 4 slots) is applied, the UE will expect to receive the PDSCH 1110 in the slot m+4, which is the fourth slot after the slot # m, as shown in FIG. 11A. In addition, the timer for antenna panel status may start at the end of the slot # m+4.

After successfully receiving and decoding the PDSCH 1110, the UE may transmit an HARQ-ACK over a PUCCH 1112 in the slot # m+6 based on the ARI contain in the second DCI message DCI_2, as shown in FIG. 11B.

Then, UE may successfully receive and decode a third DCI message DCI_3 which is transmitted over a PDCCH 1114 in the slot # m+9. The third DCI message DCI_3 may indicate to the UE to apply the TCI state #64 for a scheduling PDSCH 1116. Because the timer for antenna panel status expires in the end of the slot # m+8, the UE has already switched to the power saving mode when receiving the third DCI message DCI_3. In addition, according to FIG. 8, the TCI state #64 may indicate to the UE to receive the PDSCH 1116 in the normal power consumption mode. Because the UE needs to turn on at least N2-N1 antenna panels to switch from the power saving mode to the normal power consumption mode, the UE may apply a long K0 value (e.g., 4 slots) based on the K0 configuration (e.g., the K0 configuration shown in Table 2), and receive the PDSCH 1116 in the slot m+13 which is the fourth slot after the slot # m+9. After successfully receiving and decoding the PDSCH 1116, the UE may transmit an HARQ-ACK in the slot # k based on the ARI in the scheduling DCI (e.g., the third DCI message DCI_3), as shown in FIG. 11B.

An illustrative example (denoted as Example 2-1) will now be provided, where an RRC-configured offset value for receiving an aperiodic CSI RS may be selected based on a CSI request from the BS.

Figure 12:
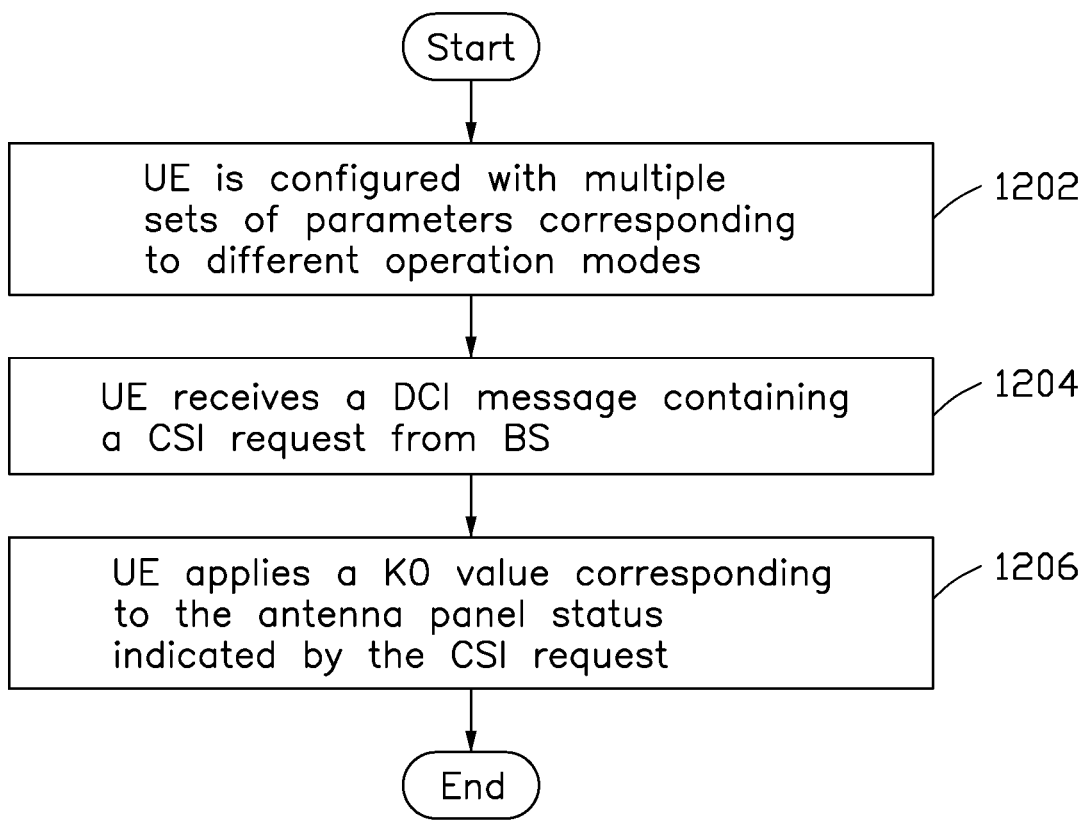
FIG. 12 is a flowchart for a method of selecting an offset value for receiving an aperiodic Channel State Information Reference Signal (CSI-RS), in accordance with example implementations of the present disclosure.

FIG. 12 is a flowchart for a method of selecting an offset value (e.g. a K0 value) for receiving an aperiodic CSI-RS, in accordance with example implementations of the present disclosure.

In action 1202, the UE may be configured with multiple sets of parameters corresponding to different operation modes (e.g., the power saving mode and the normal power consumption mode). For example, two different leading times may be predefined in the 3GPP technical specifications for the UE. One may be a shorter leading (e.g., 10 microseconds) to be used in the case that the UE does not need to further turn on an antenna panel, and the other one may be a longer leading time (e.g., 3 ms) to be used in the case that the UE needs to turn on one or more antenna panels to change the operation mode. In addition, the UE may be configured with a set of offset values (e.g., aperiodicTriggeringOffset) in an RRC configuration for receiving an aperiodic CSI-RS, as shown in FIG. 13.

FIG. 13 is an example data structure indicating an aperiodic CSI RS reception configuration, in accordance with example implementations of the present disclosure. As shown in FIG. 13, in the aperiodic CSI RS reception configuration (e.g., NZP-CSI-ResourceSet) 1302, the aperiodicTriggeringOffset may refer to a specific row entry (e.g., indexed by "10") in the K0 configuration 1304, which is associated with a normal K0 value of 2 slots and a long K0 value of 6 slots. The UE may be further configured in the power saving mode based on an initial indicator for antenna panel status (e.g., the indicator for antenna panel status 902 in FIG. 9). In addition, the numerology applied in this example may be, but not limited to, 15 KHz.

Referring back to FIG. 12. In action 1204, the UE may receive a DCI message containing a CSI request from BS. In action 1206, the UE may apply a K0 value corresponding to the antenna panel status indicated by the CSI request.

Figure 14:
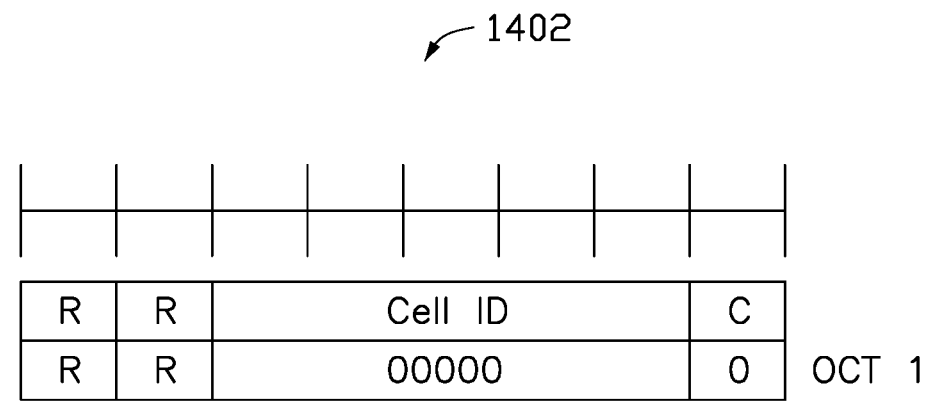

FIG. 14 is an example of a MAC-CE message, in accordance with example implementations of the present disclosure. As shown in FIG. 14, a MAC-CE message 1402 includes several bits (which are denoted as "R" in FIG. 14), a cell ID, and a control bit (which is denoted as "C" in FIG. 14). The cell ID may contain the serving cell ID (e.g., "00000" in this example). The control bit "C" may be used for indicating to the UE to enable/disable the power saving mode. For example, the UE may be indicated to enable the power saving mode when the control bit is set to a first value (e.g., "1"), or indicated to disable the power saving mode when the control bit is set to a second value (e.g., "0"). As shown in FIG. 14, the MAC-CE message 1402 of which the control bit is set to "0" may be used for indicating to the UE to disable the power saving mode (or to operate in the normal power consumption mode).

Figure 15:
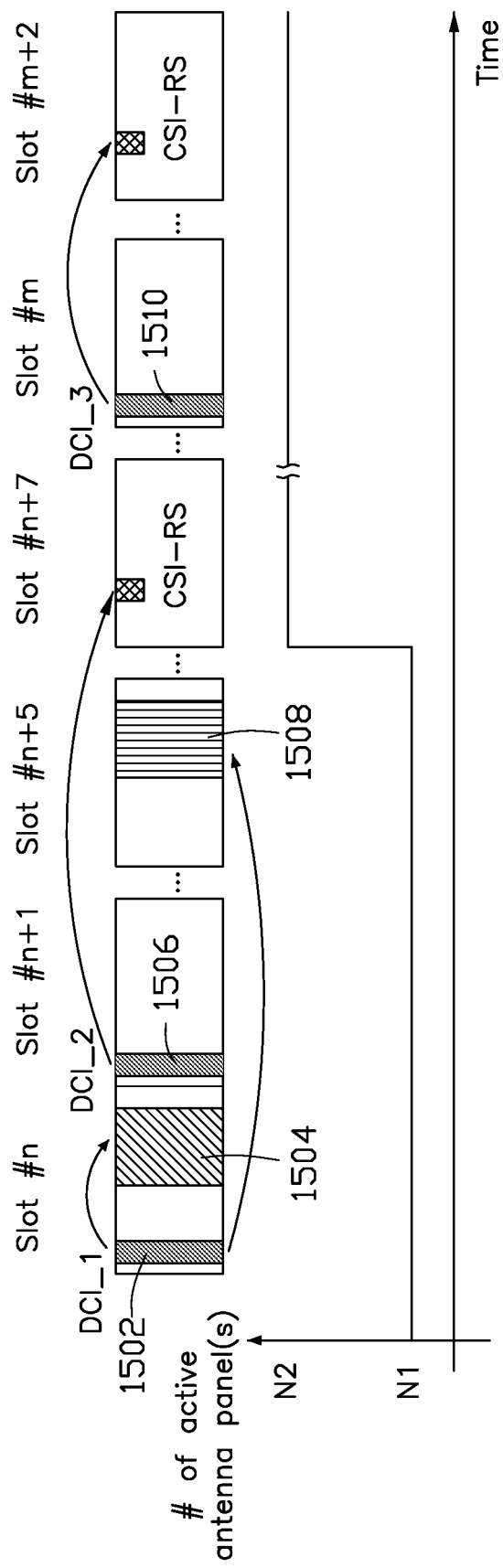
FIG. 15 is a schematic diagram illustrating that different triggering offset values are applied for the changes in an antenna panel status of a wireless communication device, in accordance with example implementations of the present disclosure.

FIG. 15 is a schematic diagram illustrating that different triggering offset values (e.g., K0 values) are applied for the changes in the antenna panel status of a wireless communication device (e.g., a UE), in accordance with example implementations of the present disclosure. In this example, the total number of turned-on/active antenna panels at the UE is N1 when the UE is in the power saving mode and is N2 when the UE is the normal power consumption mode, where N1 is less than N2. For example, N1 may be "1" and N2 may be the number of the antenna panels the UE has.

As shown in FIG. 15, in the slot # n, the UE may receive a first DCI message DCI_1 which is transmitted over a PDCCH 1502, and obtain a MAC-CE message (e.g., the MAC-CE message 1402 in FIG. 14) based on the first DCI message DCI_1. The MAC-CE message may include an indicator for antenna panel status (e.g., the control bit of the MAC-CE message 1402 in FIG. 14) used for indicating the UE to operate in the normal power consumption mode (or disable the power saving mode). Then, the UE may monitor a scheduling PDSCH 1504 based on the first DCI message DCI_1 and transmit a HARQ-ACK over a PUCCH 1508 for the MAC-CE message in the slot # n+5.

In this example, the UE may receive a second DCI message DCI_2 which is transmitted over a PDCCH 1506 in the slot # n+1. The second DCI message DCI_2 may contain a CSI request for triggering an aperiodic CSI report. For example, the CSI request for triggering the CSI-RS resource may be indicated by the BS, through the QCL information associated with the CSI-RS resource, to be received by the multiple antenna panels at the UE. In some implementations of the present disclosure, the UE may apply a normal triggering offset value when the UE does not need to further turn on an antenna panel in response to the indicator for antenna panel status obtained from the BS, and apply a long triggering offset value when the UE needs to turn on at least one antenna panel in response to the indicator for antenna panel status received from the BS. Thus, in this example, the UE may apply a long triggering offset value (e.g., aperiodicTriggeringOffset) for the CSI request to switch from the power saving mode to the normal power consumption mode. As shown in FIG. 15, the BS may transmit the CSI-RS resource in the slot #n+7, which is the sixth time slot after the slot #n+1.

In addition, the UE may further receive a third DCI message DCI_3 which is transmitted over a PDCCH 1510 in the slot # m. The third DCI message DCI_3 may contain a CSI request for triggering an aperiodic CSI report, and the CSI request may indicate the same aperiodic CSI-RS trigger state as indicated by the CSI request contained in the second DCI message DCI_2. Since the CSI-RS resource (which is triggered by the CSI request contained in the third DCI message DCI_3) is indicated to be received by the multiple antenna panels of the UE by the BS (e.g., through the QCL information which is associated with the CSI-RS resource), the UE may decide to apply a normal triggering offset value (e.g., aperiodicTriggeringOffset) of two slots for this CSI request based on the current antenna panel status (e.g., with N2 antenna panels being turned-on). Thus, as shown in FIG. 15, the UE may receive the corresponding aperiodic CSI-RS resource from the BS in the slot # m+2, which is the first time slot after the slot # m+1.

An illustrative example (denoted as Example 2-2) will now be provided, where an RRC-configured offset value for an aperiodic CSI RS reception may be selected based on a CSI request from the BS and a timer for antenna panel status.

In Example 2-2, the UE may be further configured with a timer for antenna panel status in addition to the multiple sets of parameters configured in action 1202 of FIG. 12. For example, the configuration of the timer for antenna panel status may be, but not limited to, the configuration 602 in FIG. 6. In some implementations of the present disclosure, the numerology of the timer for antenna panel status may be determined based on the scheduling PDSCH of the active DL BWP.

Figure 16A:
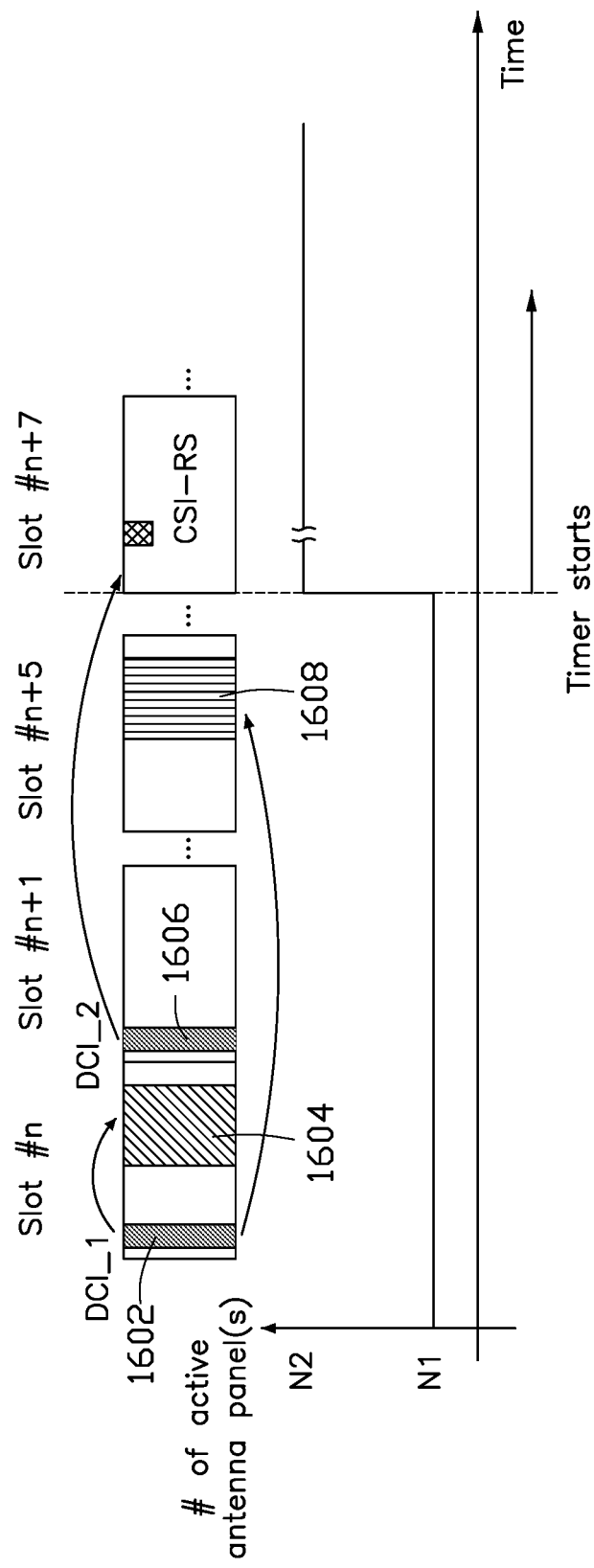
FIGS. 16A and 16B are schematic diagrams illustrating that different triggering offset values are applied for the changes in an antenna panel status of a wireless communication device, in accordance with example implementations of the present disclosure.
Figure 16B:
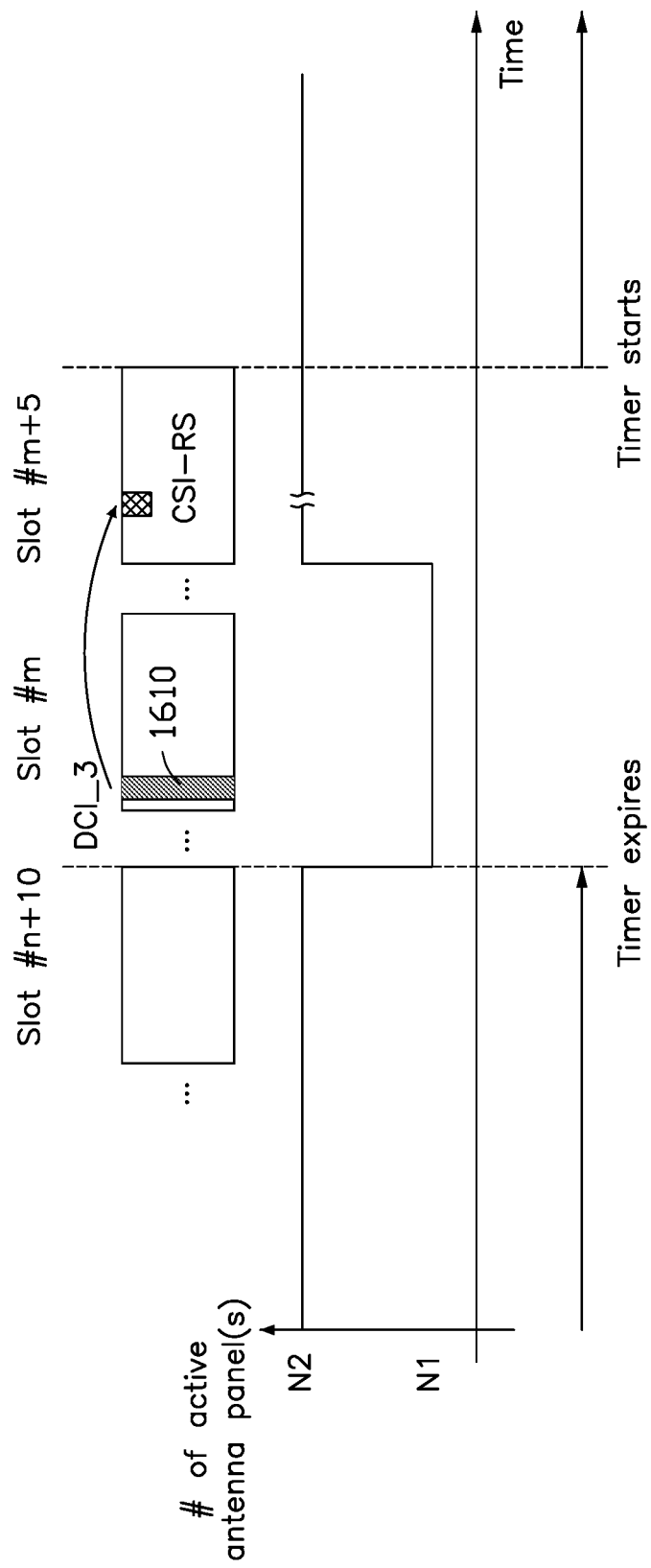

FIGS. 16A and 16B are schematic diagrams illustrating that different triggering offset values (e.g., K0 values) are applied for the changes in the antenna panel status of a wireless communication device (e.g., a UE), in accordance with example implementations of the present disclosure. It should be noted that FIG. 16B is continued from the FIG. 16A. In this example, the total number of turned-on/active antenna panels at the UE is N1 when the UE is in the power saving mode and is N2 when the UE is the normal power consumption mode, where N1 is less than N2. For example, N1 may be "1" and N2 may be the number of the antenna panels the UE has.

As shown in FIG. 16A, in the slot # n, the UE may receive a first DCI message DCI_1 which is transmitted over a PDCCH 1602, and obtain a MAC-CE message (e.g., the MAC-CE message 1402 in FIG. 14) based on the first DCI message DCI_1. The MAC-CE message may include an indicator for antenna panel status (e.g., the control bit of the MAC-CE message 1402 in FIG. 14) that may indicate to the UE to operate in the normal power consumption mode. The UE may monitor a scheduling PDSCH 1604 based on the first DCI message DCI_1 and transmit an HARQ-ACK over a PUCCH 1608 for the MAC-CE message in the slot # n+5.

In addition, the UE may receive a second DCI message DCI_2 which is transmitted over a PDCCH 1606 in the slot n+1. The second DCI message DCI_2 may contain a CSI request for triggering an aperiodic CSI report. For example, the CSI request for triggering the CSI-RS resource may be indicated by the BS, through the QCL information associated with the CSI-RS resource, to be received by the multiple antenna panels at the UE. As described above, the UE may apply a long triggering offset value (e.g., aperiodicTriggeringOffset) for the CSI request because the UE may need to turn on at least one antenna panel in response to the indicator for antenna panel status obtained from the BS. As shown in FIG. 16A, the BS may transmit the CSI-RS resource in the slot #n+7, which is the sixth time slot after the slot #n+1. In this example, the timer for antenna panel status may also start at the beginning of the slot #n+7.

Referring to FIG. 16B. The timer may then expire at the end of the slot n+10, and the UE may switch from the normal power consumption mode to the power saving mode. In addition, the UE may then receive a third DCI message DCI_3 which is transmitted over a PDCCH 1610 in the slot # m, where m>n+10. The third DCI message DCI_3 may contain a CSI request for triggering an aperiodic CSI report, and the CSI request may indicate the same aperiodic CSI-RS trigger state as indicated by the second DCI message DCI_2. Since the CSI-RS resource triggered by the CSI request is indicated by the BS, through the QCL information associated to the CSI-RS resource, to be received by multiple antenna panels of the UE, the UE may decide to apply a long triggering offset value (e.g., aperiodicTriggeringOffset) for this CSI request based on current antenna panels status (e.g., with N1 antenna panels being turned-on). Thus, as shown in FIG. 16B, the BS may transmit the aperiodic CSI-RS resource in the slot # m+5, which is the fifth time slot after the slot # m.

An illustrative example (denoted as Example 3-1) will now be provided, where a UE may indicate its antenna panel status through at least one explicit bit in a CSI report.

Figure 17:
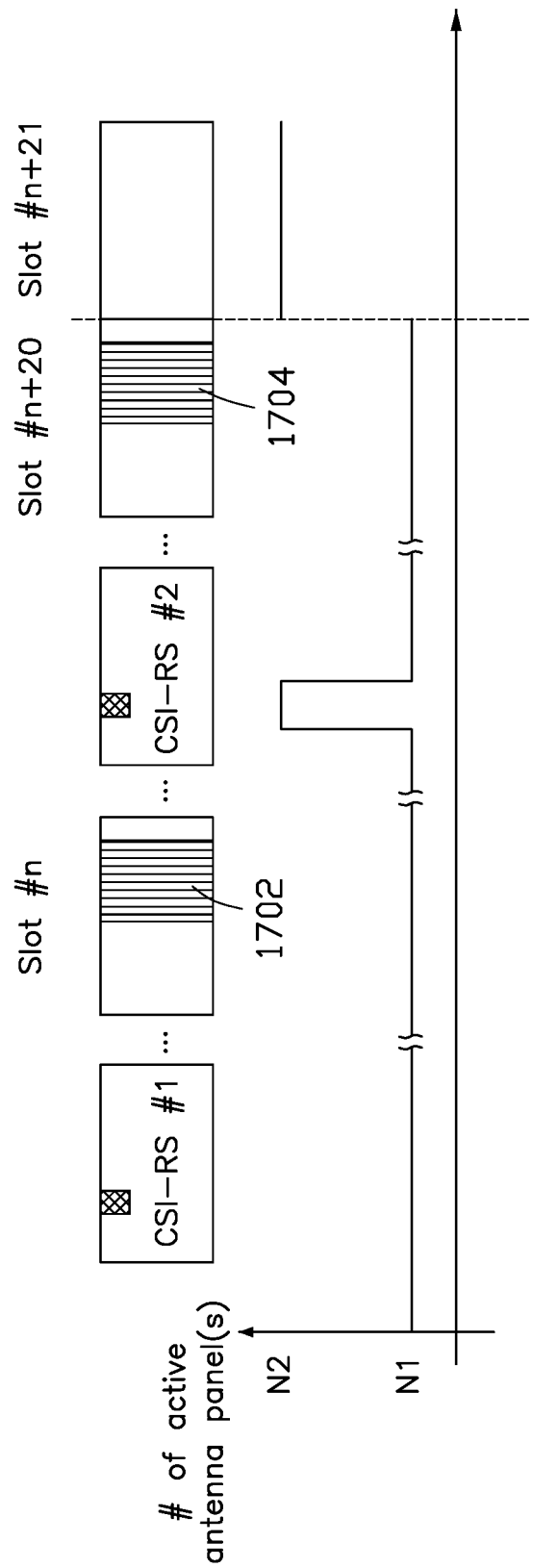
FIG. 17 is a schematic diagram illustrating a timeline of an antenna panel status of a wireless communication device, in accordance with example implementations of the present disclosure.

FIG. 17 is a schematic diagram illustrating a timeline of the antenna panel status of a wireless communication device (e.g., a UE), in accordance with example implementations of the present disclosure. In this example, the total number of turned-on/active antenna panels at the UE is N1 when the UE is in the power saving mode and is N2 when the UE is the normal power consumption mode, where N1 is less than N2.

In this example, the UE may be configured with a periodic CSI report and the periodicity for the CSI report may be 20 slots. In addition, the UE may be configured with a timer for antenna panel status. The configuration of the timer for antenna panel status may be, but not limited to, the configuration 602 shown in FIG. 6. In some implementations of the present disclosure, the numerology of the timer for antenna panel status may be determined based on the scheduling PDSCH of active DL BWP.

Referring back to FIG. 17, the UE may use N1 antenna panel(s) to receive a CSI-RS #1 for calculating a CSI report which is to be transmitted over a PUCCH 1702 in the slot # n. Hence, the bit field in the CSI report may be set to a first value (e.g., "1") to indicate that the UE is in the power saving mode.

On the other hand, if the UE changes to use multiple antenna panels to receive the CSI-RS #2 for calculating a CSI report which is to be transmitted over a PUCCH 1704 in the slot # n+20, the bit field in this CSI report may be set to a second value (e.g., "0") to indicate that the UE is in normal power consumption mode (e.g., by disabling the power saving mode).

An illustrative example (denoted as Example 4-1) will now be provided, where the antenna panel status may be switched based on a DRX operation.

Figure 18:
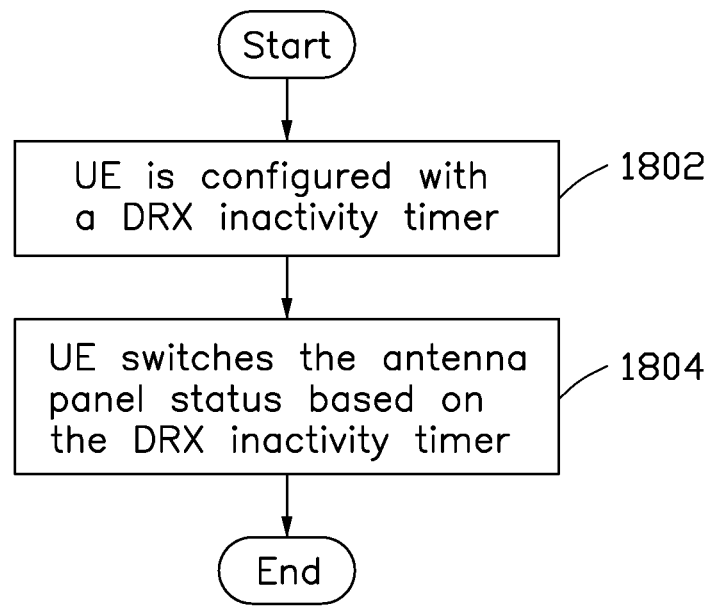
FIG. 18 is flowchart for a method for determining an antenna panel status of a wireless communication device based on a Discontinuous Reception (DRX) operation, in accordance with example implementations of the present disclosure.

FIG. 18 is a flowchart for a method for determining the antenna panel status of a wireless communication device (e.g., a UE) based on a DRX operation, in accordance with example implementations of the present disclosure. As shown in FIG. 18, in action 1802, the UE may be configured with a DRX inactivity timer by the BS. In action 1804, the UE may switch the antenna panel status based on the DRX inactivity timer.

In some implementations of the present disclosure, the DRX inactivity timer may be used to define how long a UE should remain in the ON state after the reception of a PDCCH. For example, while the DRX inactivity timer is running, the UE may remain in the ON state.

In Example 4-1, the UE may be configured with a DRX period and a timer for antenna panel status. In addition, the BS may indicate to the UE to operate in the normal power consumption mode, as shown in FIG. 19.

FIG. 19 is an example data structure indicating an RRC configuration for the UE, in accordance with example implementations of the present disclosure. As shown in FIG. 19, an RRC configuration 1902 may include a DRX configuration and an antenna panel status configuration. The DRX configuration may be configured with a DRX inactivity timer for 2 ms and a DRX cycle of 50 ms. The antenna panel status configuration may indicate that the power saving mode is to be disabled (e.g., with a "false" value) and the length of the timer for the antenna panel status is four slots.

Figure 20:
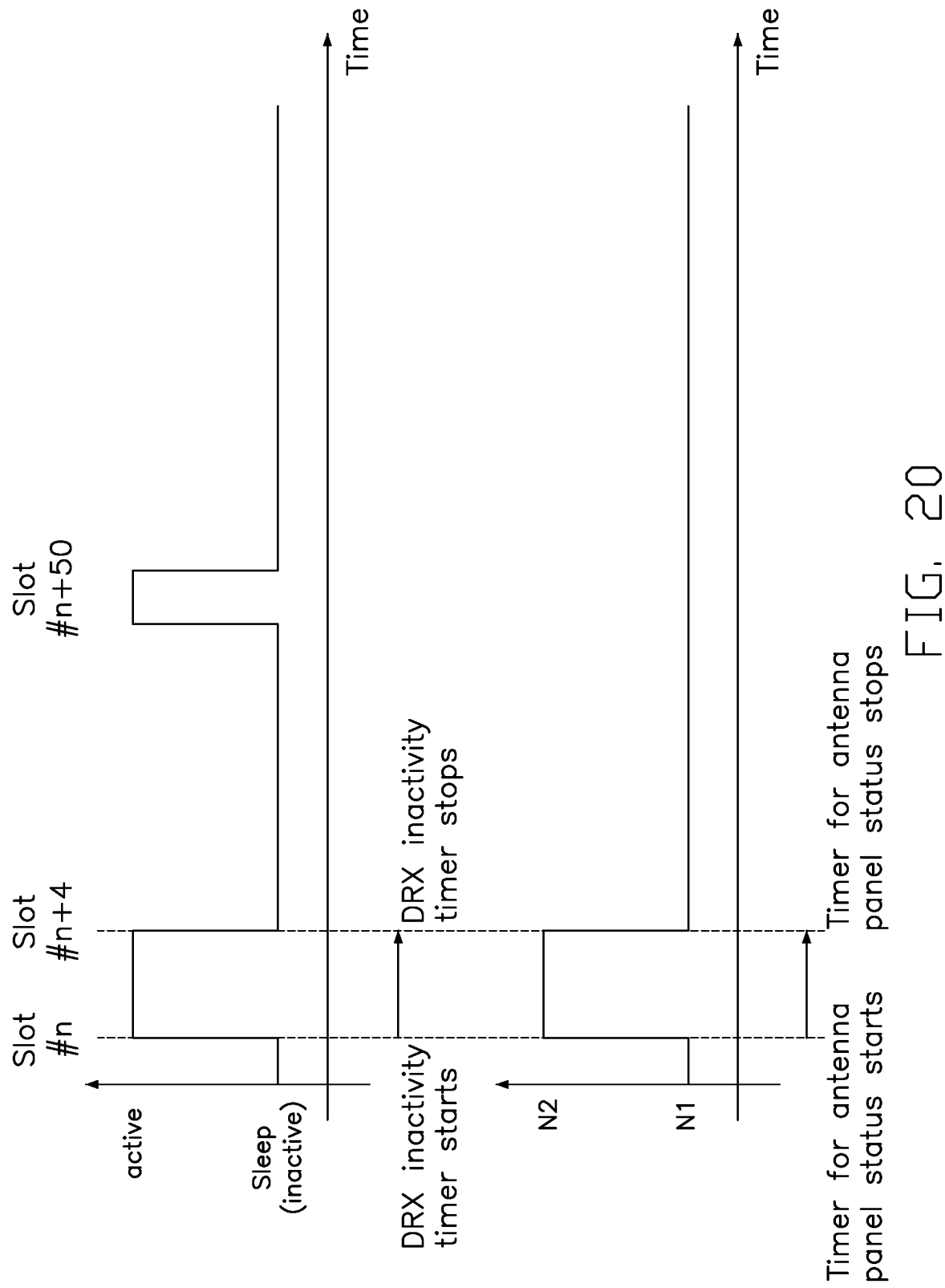
FIG. 20 is a schematic diagram illustrating a timeline of an antenna panel status of a wireless communication device and a timing diagram of a DRX cycle, in accordance with example implementations of the present disclosure.

FIG. 20 is a schematic diagram illustrating a timeline of the antenna panel status of a wireless communication device (e.g., a UE) and a timing diagram of a DRX cycle, in accordance with example implementations of the present disclosure. In the present implementation, the timer for antenna panel status may have the same operation as the DRX inactivity timer. In addition, the total number of turned-on/active antenna panels at the UE is N1 when the UE is in the power saving mode and is N2 when the UE is the normal power consumption mode, where N1 is less than N2.

As shown in FIG. 20, the UE may receive a DCI message in the slot # n at which the UE is in a DRX on-duration. In response to receiving the DCI message, the UE may start both the DRX inactivity timer and the timer for antenna panel status, if the DCI message is used for indicating to the UE to operate in the normal power consumption mode. Then, if the timer for antenna panel status is going to stop/expire at the beginning of the slot # n+4 (e.g., according to the RRC configuration 1902 in FIG. 19), the DRX inactivity timer may follow the timer for antenna panel status to stop/expire at the same timing (e.g., at the beginning of the slot # n+4). Thus, the UE may enter a DRX off-duration and operate in the power saving mode at the same time.

An illustrative example (denoted as Example 4-2) will now be provided, where the antenna panel status may be switched based on a DRX operation.

In Example 4-2, the UE may be configured with a DRX inactivity timer by the BS. In addition, the UE may be indicated by the BS to operate in the normal power consumption mode based on an RRC configuration, as shown in FIG. 21.

FIG. 21 is an example data structure indicating an RRC configuration for the UE, in accordance with example implementations of the present disclosure. As shown in FIG. 21 an RRC configuration 2102 may include a DRX configuration and an antenna panel status configuration. The DRX configuration may be configured with a DRX inactivity timer for 2 ms and a DRX cycle of 50 ms. Furthermore, the antenna panel status configuration may indicate that the power saving mode is to be disabled (e.g., with a "False" value).

Figure 22:
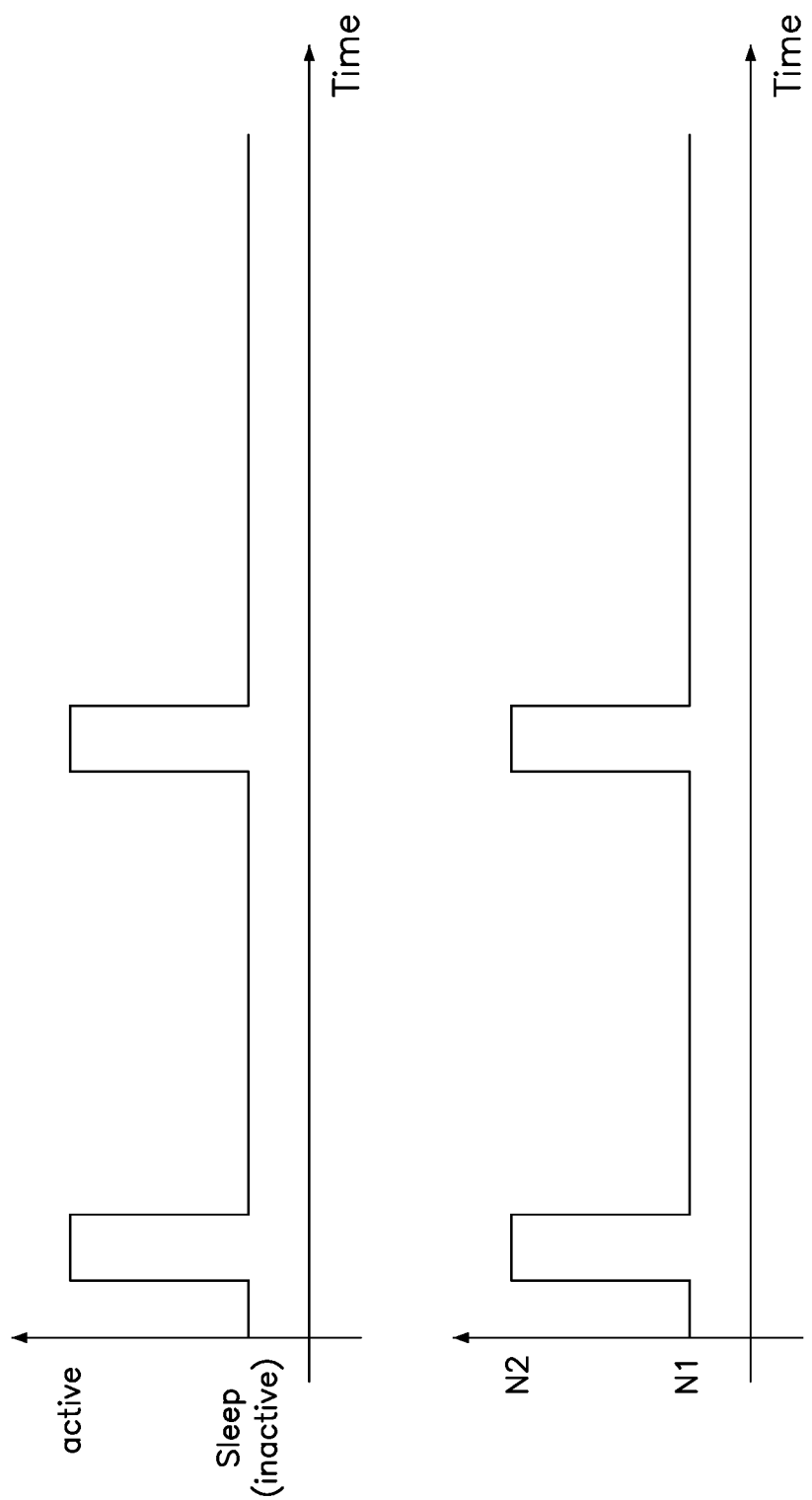
FIG. 22 is a schematic diagram illustrating a timeline of an antenna panel status of a wireless communication device and a timing diagram of a DRX cycle, in accordance with example implementations of the present disclosure.

FIG. 22 is a schematic diagram illustrating a timeline of the antenna panel status of a wireless communication device (e.g., a UE) and a timing diagram of a DRX cycle, in accordance with example implementations of the present disclosure. In the present implementation, the antenna panel status of a UE may follow the DRX cycles. In addition, the total number of turned-on/active antenna panels at the UE is N1 when the UE is in the power saving mode, and is N2 when the UE is the normal power consumption mode, where N1 is less than N2.

As shown in FIG. 22, the UE may at first operate in the normal power consumption mode based on the most recently received BS instruction (e.g., received through an RRC configuration, a MAC-CE message or a DCI message). If the UE does not receive a PDCCH in the DRX on-duration (at which the UE is in an active state), the UE may then switch to the power saving mode after the UE enters the DRX off-duration (at which the UE is in an inactive/sleep state).

Figure 23:
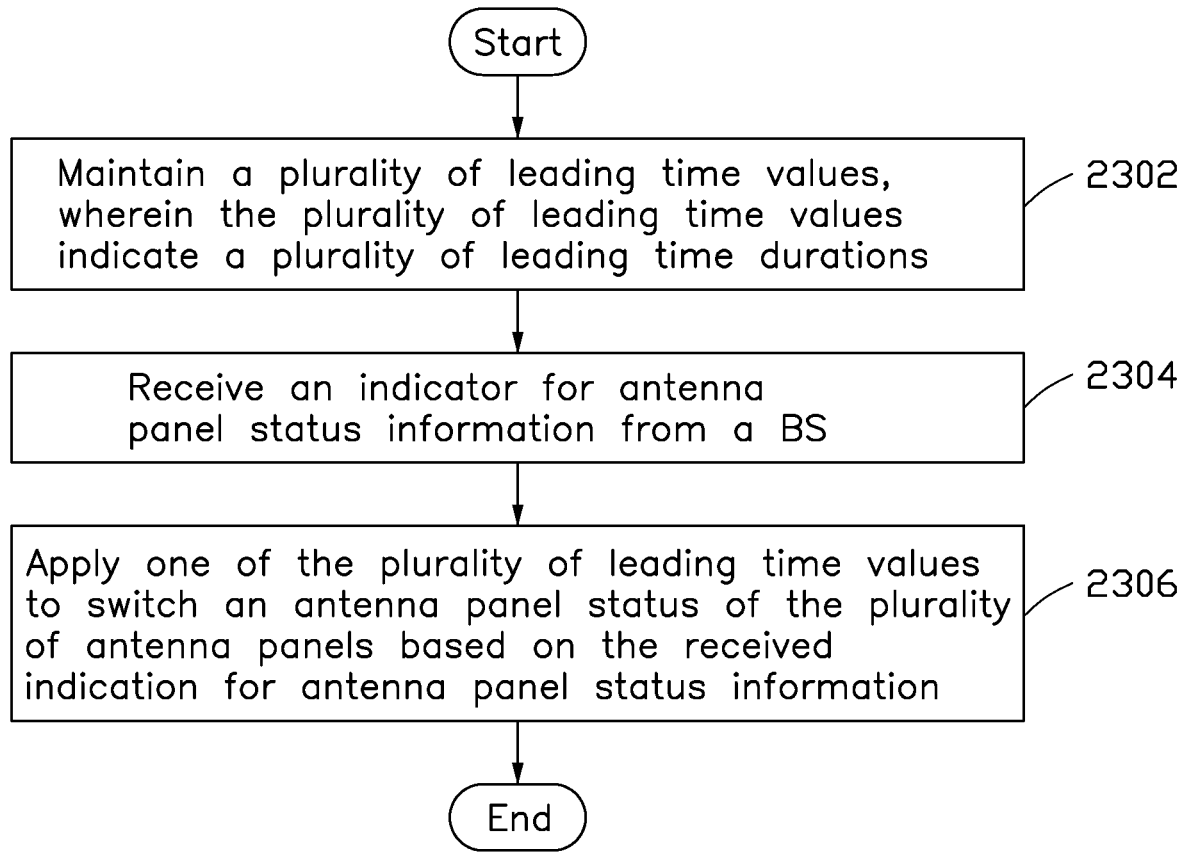
FIG. 23 is a flowchart for a method of operating multiple antenna panels, in accordance with example implementations of the present disclosure.

FIG. 23 is a flowchart for a method of operating multiple antenna panels, in accordance with example implementations of the present disclosure.

In action 2302, a wireless communication device (e.g., a UE) may maintain a plurality of leading time values, wherein the plurality of leading time values may indicate a plurality of leading time durations.

In action 2304, the wireless communication device may receive an indicator for antenna panel status information from a BS.

In action 2306, the wireless communication device may apply one of the plurality of leading time values to switch an antenna panel status of the plurality of antenna panels based on the received indicator for antenna panel status information.

Figure 24:
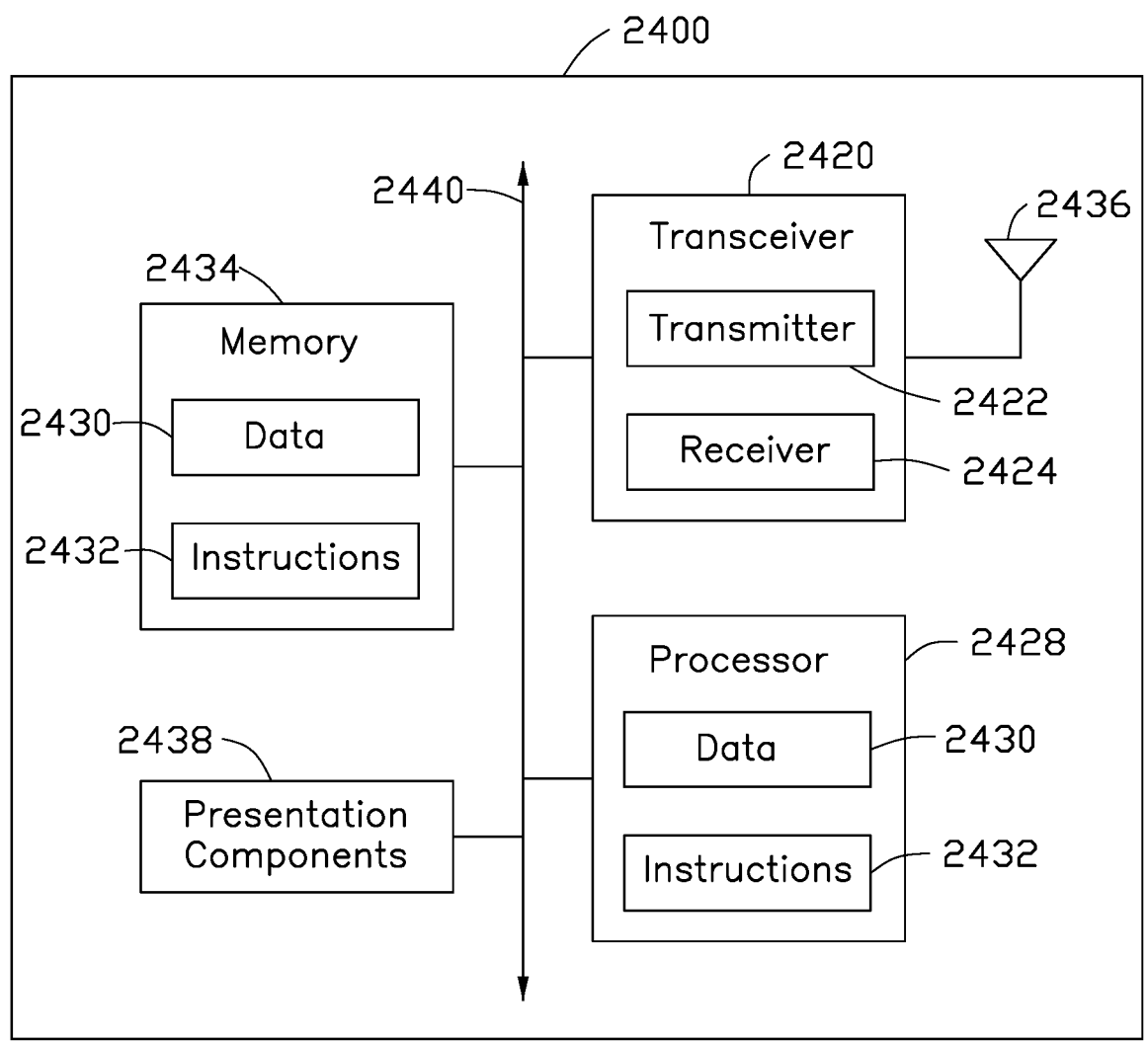
FIG. 24 is a block diagram illustrating a node for wireless communication, in accordance with various aspects of the present disclosure.

FIG. 24 is a block diagram illustrating a node for wireless communication, in accordance with various aspects of the present application. As shown in FIG. 24, a node 2400 may include a transceiver 2420, a processor 2428, a memory 2434, one or more presentation components 2438, and at least one antenna 2436. The node 2400 may also include an RF spectrum band module, a BS communications module, a network communications module, and a system communications management module, Input/Output (I/O) ports, I/O components, and power supply (not explicitly shown in FIG. 24). Each of these components may be in communication with each other, directly or indirectly, over one or more buses 2440. In one implementation, the node 2400 may be a UE or a BS that performs various functions described herein, for example, with reference to FIGS. 1 through 23.

The transceiver 2420 having a transmitter 2422 (e.g., transmitting/transmission circuitry) and a receiver 2424 (e.g., receiving/reception circuitry) may be configured to transmit and/or receive time and/or frequency resource partitioning information. In some implementations, the transceiver 2420 may be configured to transmit in different types of subframes and slots including, but not limited to, usable, non-usable and flexibly usable subframes and slot formats. The transceiver 2420 may be configured to receive data and control channels.

The node 2400 may include a variety of computer-readable media. Computer-readable media may be any available media that may be accessed by the node 2400 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 2434 may include computer-storage media in the form of volatile and/or non-volatile memory. The memory 2434 may be removable, non-removable, or a combination thereof. Example memory includes solid-state memory, hard drives, optical-disc drives, and etc. As illustrated in FIG. 24, The memory 2434 may store computer-readable, computer-executable instructions 2432 (e.g., software codes) that are configured to, when executed, cause the processor 2428 to perform various functions described herein, for example, with reference to FIGS. 1 through 23. Alternatively, the instructions 2432 may not be directly executable by the processor 2428 but be configured to cause the node 2400 (e.g., when compiled and executed) to perform various functions described herein.

The processor 2428 (e.g., having processing circuitry) may include an intelligent hardware device, e.g., a Central Processing Unit (CPU), a microcontroller, an ASIC, and etc. The processor 2428 may include memory. The processor 2428 may process the data 2430 and the instructions 2432 received from the memory 2434, and information through the transceiver 2420, the base band communications module, and/or the network communications module. The processor 2428 may also process information to be sent to the transceiver 2420 for transmission through the antenna 2436, to the network communications module for transmission to a core network.

One or more presentation components 2438 presents data indications to a person or other device. Examples of presentation components 2438 may include a display device, speaker, printing component, vibrating component, etc.

From the above description, it is manifested that various techniques may be used for implementing the concepts described in the present application without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A wireless communication device comprising:
a plurality of antenna panels;
a processor coupled to the plurality of antenna panels and configured to:
maintain a plurality of leading time values, the plurality of leading time values indicating a plurality of leading time durations;
receive an indicator for antenna panel status information from a base station (BS);
apply one of the plurality of leading time values to switch an antenna panel status of the plurality of antenna panels based on the indicator for antenna panel status information;
receive a scheduling offset value from the BS, the scheduling offset value comprising at least one of a K0 parameter for a Downlink (DL) channel and a K2 parameter for an Uplink (UL) channel; and
determine that the scheduling offset value is invalid, when a time duration indicated by the scheduling offset value is less than a leading time duration indicated by the applied leading time value.

2. The wireless communication device of claim 1, wherein the processor is further configured to:
receive a timer from the BS; and
switch the antenna panel status from a first antenna panel status to a second antenna panel status after the timer expires.

3. The wireless communication device of claim 2, wherein the timer expires when one of a Discontinuous Reception (DRX) inactivity timer expires and the wireless communication device enters one of a DRX off-period and a sleep mode.

4. The wireless communication device of claim 1, wherein the processor is further configured to:
transmit an antenna panel status report to inform the BS of the switch of the antenna panel status.

5. The wireless communication device of claim 4, wherein the antenna panel status report is contained in one of a beam report and a Channel State Information (CSI) report.

6. The wireless communication device of claim 4, wherein the antenna panel status report comprises a single-bit Information Element (IE), and the processor is further configured to:
set the single-bit IE to a first value to indicate that a power saving mode is enabled; and
set the single-bit IE to a second value to indicate that the power saving mode is disabled,
wherein a total number of turned-on antenna panels in the plurality of antenna panels when the power saving mode is enabled is less than a total number of turned-on antenna panels in the plurality of antenna panels when the power saving mode is disabled.

7. The wireless communication device of claim 4, wherein the antenna panel status report comprises a multiple-bit Information Element (IE), and the processor is further configured to:
set the multiple-bit IE to a particular value associated with a particular number of the plurality of antenna panels being turned on.

8. The wireless communication device of claim 1, wherein the indicator for antenna panel status information comprises a single-bit Information Element (IE), and the processor is further configured to:
enable a power saving mode when the single-bit IE is set to a first value; and
disable the power saving mode when the single-bit IE is set to a second value,
wherein a total number of turned-on antenna panels in the plurality of antenna panels when the power saving mode is enabled is less than a total number of turned-on antenna panels in the plurality of antenna panels when the power saving mode is disabled.

9. The wireless communication device of claim 1, wherein the indicator for antenna panel status information comprises a multiple-bit Information Element (IE), and the processor is further configured to:
turn on a particular number of the plurality of antenna panels when the multiple-bit IE is set to a particular value.

10. The wireless communication device of claim 1, wherein the indicator for antenna panel status information is contained in a Transmission Configuration Indicator (TCI) state Identity (ID) indicated by the BS.

11. The wireless communication device of claim 1, wherein the plurality of leading time values is one of cell-specific values and cell group-specific values.

12. The wireless communication device of claim 1, wherein the processor is further configured to:
switch the antenna panel status from a first antenna panel status to a second antenna panel status in response to receiving the indicator for antenna panel status information; and
automatically switch the antenna panel status from the second antenna panel status to a third antenna panel status without further reception of an indicator for antenna panel status information from the BS.

13. The wireless communication device of claim 1, wherein the processor is further configured to:
enable a power saving mode when the wireless communication device operates in a Discontinuous Reception (DRX) active time; and
disable the power saving mode when the wireless communication device operates in a DRX inactive time,
wherein a total number of turned-on antenna panels in the plurality of antenna panels when the power saving mode is enabled is less than a total number of turned-on antenna panels in the plurality of antenna panels when the power saving mode is disabled.

14. The wireless communication device of claim 1, wherein the processor is further configured to:
enable a power saving mode based on whether the wireless communication device operates in a particular Bandwidth Part (BWP),
wherein:
a total number of turned-on antenna panels in the plurality of antenna panels when the power saving mode is enabled is less than a total number of turned-on antenna panels in the plurality of antenna panels when the power saving mode is disabled; and
the particular BWP is one of a default BWP, an initial BWP, and a first active BWP.

15. A method performed by a wireless communication device for operating a plurality of antenna panels, the method comprising:

maintaining a plurality of leading time values, the plurality of leading time values indicating a plurality of leading time durations;
receiving an indicator for antenna panel status information from a base station (BS);
applying one of the plurality of leading time values to switch an antenna panel status of the plurality of antenna panels based on the indicator for antenna panel status information;
receiving a scheduling offset value from the BS, the scheduling offset value comprising at least one of a K0 parameter for a Downlink (DL) channel and a K2 parameter for an Uplink (UL) channel; and
determining that the scheduling offset value is invalid, when a time duration indicated by the scheduling offset value is less than a leading time duration indicated by the applied leading time value.

16. The method of claim 15, further comprising:
receiving a timer from the BS; and
switching the antenna panel status from a first antenna panel status to a second antenna panel status after the timer expires.

17. The method of claim 16, wherein the timer expires when one of a Discontinuous Reception (DRX) inactivity timer expires and the wireless communication device enters one of a DRX off-period and a sleep mode.

18. The method of claim 15, further comprising:
transmitting an antenna panel status report to inform the BS of the switch of the antenna panel status.

19. The method of claim 18, wherein the antenna panel status report is contained in one of a beam report and a Channel State Information (CSI) report.

20. The method of claim 18, wherein the antenna panel status report comprises a single-bit Information Element (IE), and the method further comprises:
setting the single-bit IE to a first value to indicate that a power saving mode is enabled; and
setting the single-bit IE to a second value to indicate that the power saving mode is disabled;
wherein a total number of turned-on antenna panels in the plurality of antenna panels when the power saving mode is enabled is less than a total number of turned-on antenna panels in the plurality of antenna panels when the power saving mode is disabled.

21. The method of claim 18, wherein the antenna panel status report comprises a multiple-bit Information Element (IE), and the method further comprises:
setting the multiple-bit IE to a particular value associated with a particular number of the plurality of antenna panels being turned on.

22. The method of claim 15, wherein the indicator for antenna panel status information comprises a single-bit Information Element (IE), and the method further comprises:
enabling a power saving mode when the single-bit IE is set to a first value; and
disabling the power saving mode when the single-bit IE is set to a second value,
wherein a total number of turned-on antenna panels in the plurality of antenna panels when the power saving mode is enabled is less than a total number of turned-on antenna panels in the plurality of antenna panels when the power saving mode is disabled.

23. The method of claim 15, wherein the indicator for antenna panel status information comprises a multiple-bit Information Element (IE), and the method further comprises:
turning on a particular number of the plurality of antenna panels when the multiple-bit IE is set to a particular value.

24. The method of claim 15, wherein the indicator for antenna panel status information is contained in a Transmission Configuration Indicator (TCI) state Identity (ID) indicated by the BS.

25. The method of claim 15, wherein the plurality of leading time values is one of cell-specific values and cell group-specific values.

26. The method of claim 15, further comprising:
switching the antenna panel status from a first antenna panel status to a second antenna panel status in response to receiving the indicator for antenna panel status information; and
automatically switch the antenna panel status from the second antenna panel status to a third antenna panel status without further reception of an indicator for antenna panel status information from the BS.

27. The method of claim 15, further comprising:
enabling a power saving mode when the wireless communication device operates in a Discontinuous Reception (DRX) active time; and
disabling the power saving mode when the wireless communication device operates in a DRX inactive time,
wherein a total number of turned-on antenna panels in the plurality of antenna panels when the power saving mode is enabled is less than a total number of turned-on antenna panels in the plurality of antenna panels when the power saving mode is disabled.

28. The method of claim 15, further comprising:
enabling a power saving mode based on whether the wireless communication device operates in a particular Bandwidth Part (BWP),
wherein:
a total number of turned-on antenna panels in the plurality of antenna panels when the power saving mode is enabled is less than a total number of turned-on antenna panels when the power saving mode is disabled; and
the particular BWP is one of a default BWP, an initial BWP, and a first active BWP.

* * * * *